(12) United States Patent
Ono

(10) Patent No.: US 11,864,502 B2
(45) Date of Patent: Jan. 9, 2024

(54) EMITTER AND DRIP IRRIGATION TUBE

(71) Applicant: Enplas Corporation, Saitama (JP)

(72) Inventor: Koki Ono, Saitama (JP)

(73) Assignee: Enplas Corporation, Saitama (JP)

( * ) Notice: Subject to any disclaimer, the term of this patent is extended or adjusted under 35 U.S.C. 154(b) by 422 days.

(21) Appl. No.: 17/263,179

(22) PCT Filed: Jul. 16, 2019

(86) PCT No.: PCT/JP2019/027851
§ 371 (c)(1),
(2) Date: Jan. 26, 2021

(87) PCT Pub. No.: WO2020/022115
PCT Pub. Date: Jan. 30, 2020

(65) Prior Publication Data
US 2021/0176928 A1  Jun. 17, 2021

(30) Foreign Application Priority Data

Jul. 26, 2018  (JP) ................................. 2018-140276
Nov. 28, 2018  (JP) ................................. 2018-222273

(51) Int. Cl.
*A01G 25/02* (2006.01)
*A01G 25/00* (2006.01)

(52) U.S. Cl.
CPC ...... *A01G 25/023* (2013.01); *A01G 2025/006* (2013.01)

(58) Field of Classification Search
CPC .................................................. A01G 25/023
See application file for complete search history.

(56) References Cited

U.S. PATENT DOCUMENTS 9,943,045 B2 *  4/2018  Kidachi .................. B05B 1/202
9,992,939 B2 *  6/2018  Kidachi .................. A01G 25/16
10,034,439 B2 *  7/2018  Kidachi ............... A01G 25/023
(Continued)

FOREIGN PATENT DOCUMENTS

| JP | 2017-042106 | 3/2017 |
|---|---|---|
| WO | WO 2017/093882 | 6/2017 |
| WO | WO 2020/022115 | 1/2020 |

OTHER PUBLICATIONS

International Search Report and the Written Opinion dated Oct. 15, 2019 From the International Searching Authority Re. Application No. PCT/JP2019/027851 and Its Translation of Search Report Into English. (9 Pages).

*Primary Examiner* — Joseph A Greenlund

(57) ABSTRACT

The present invention relates to an emitter that can properly exhibit a flow rate adjustment function even when produced by molding a resin material having low hardness. The emitter has an emitter body and a base part stored in the emitter body. The emitter body comprises a water intake part, a reduced-pressure flow path groove, a storage part, and a diaphragm part. The base part has a base, a communication hole, and a deformation prevention part that is disposed protruding from the reverse surface to the surface of the base which the diaphragm part deformed by the pressure of a drip irrigation liquid contacts, and when the diaphragm part contacts the base by the pressure of the drip irrigation liquid, contacts the tube to prevent the base from being deformed by the pressure of the drip irrigation liquid.

5 Claims, 20 Drawing Sheets

(56) References Cited

U.S. PATENT DOCUMENTS

| | | | |
|---|---|---|---|
| 10,212,896 B2* | 2/2019 | Kidachi | B05B 1/3006 |
| 10,362,740 B2* | 7/2019 | Kidachi | A01G 25/023 |
| 10,462,983 B2* | 11/2019 | Socolsky | A01G 25/023 |
| 10,542,683 B2* | 1/2020 | Morikoshi | A01G 25/023 |
| 10,595,476 B2* | 3/2020 | Morikoshi | A01G 25/023 |
| 11,252,879 B2* | 2/2022 | Socolsky | A01G 25/023 |
| 11,310,969 B2* | 4/2022 | Yanagisawa | A01G 25/023 |
| 2004/0164185 A1 | 8/2004 | Giuffre | |
| 2006/0163388 A1* | 7/2006 | Mari | A01G 25/023 239/542 |
| 2009/0266919 A1* | 10/2009 | Mavrakis | A01G 25/06 239/542 |
| 2010/0282873 A1* | 11/2010 | Mattlin | A01G 25/023 239/533.1 |
| 2016/0286740 A1* | 10/2016 | Kidachi | A01G 25/023 |
| 2016/0286741 A1* | 10/2016 | Kidachi | A01G 25/16 |
| 2018/0192598 A1* | 7/2018 | Kidachi | A01G 25/023 |
| 2018/0279565 A1* | 10/2018 | Morikoshi | A01G 25/02 |
| 2018/0359962 A1* | 12/2018 | Noguchi | A01G 25/023 |
| 2019/0174686 A1* | 6/2019 | Morikoshi | A01G 25/023 |
| 2019/0183074 A1* | 6/2019 | Morikoshi | A01G 25/02 |
| 2019/0281774 A1* | 9/2019 | Noguchi | A01G 25/16 |

\* cited by examiner

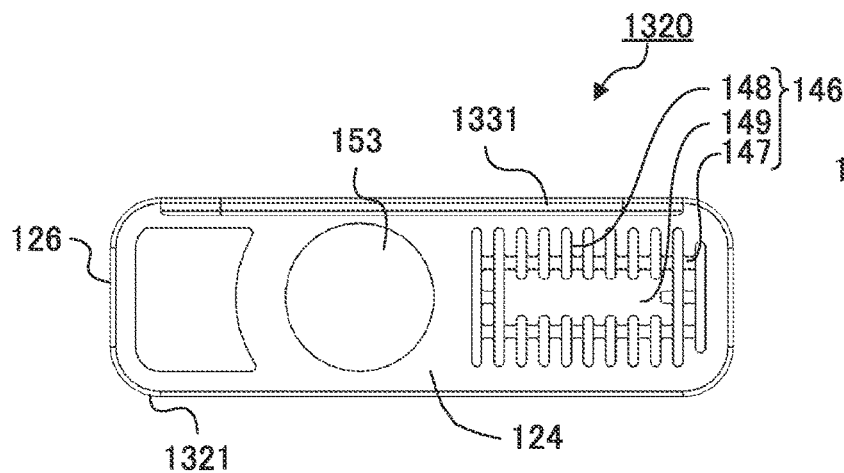 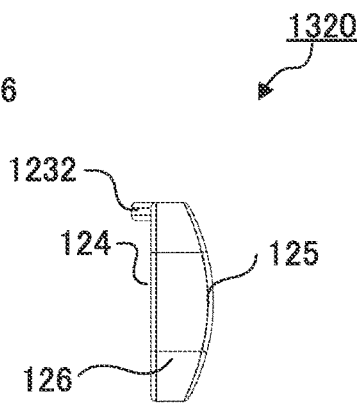
FIG. 14A  FIG. 14B
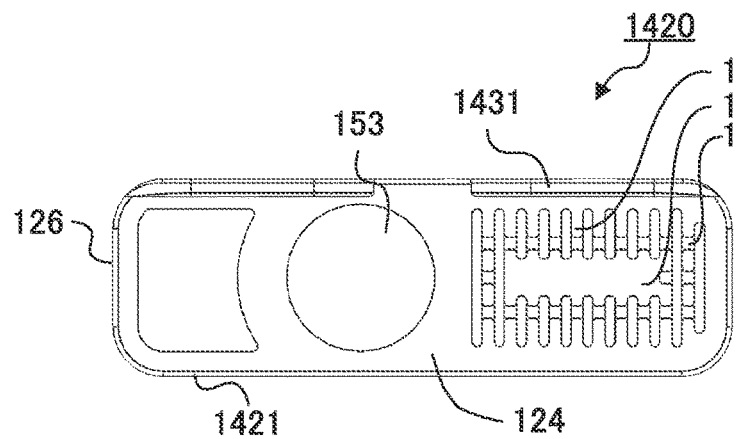 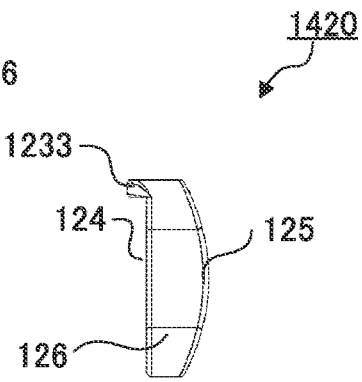
FIG. 14C  FIG. 14D
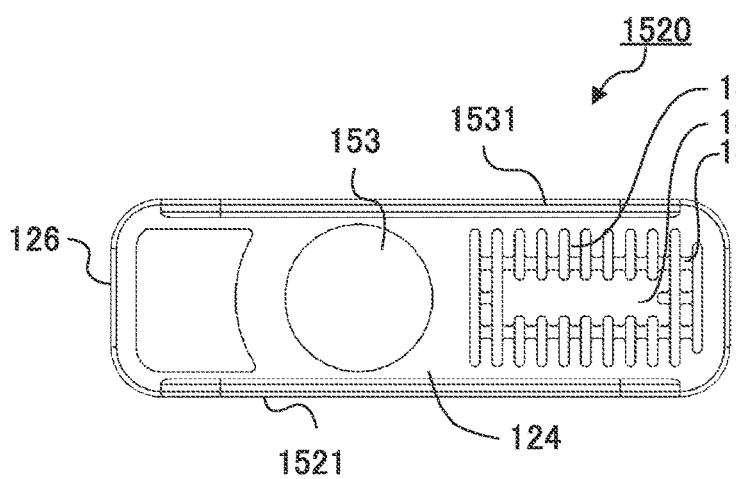 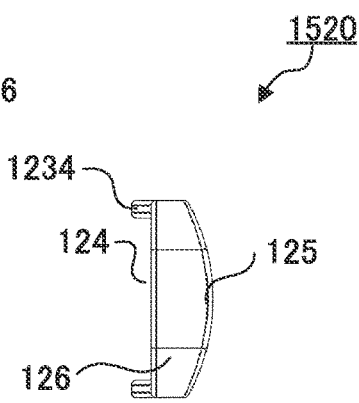
FIG. 14E  FIG. 14F

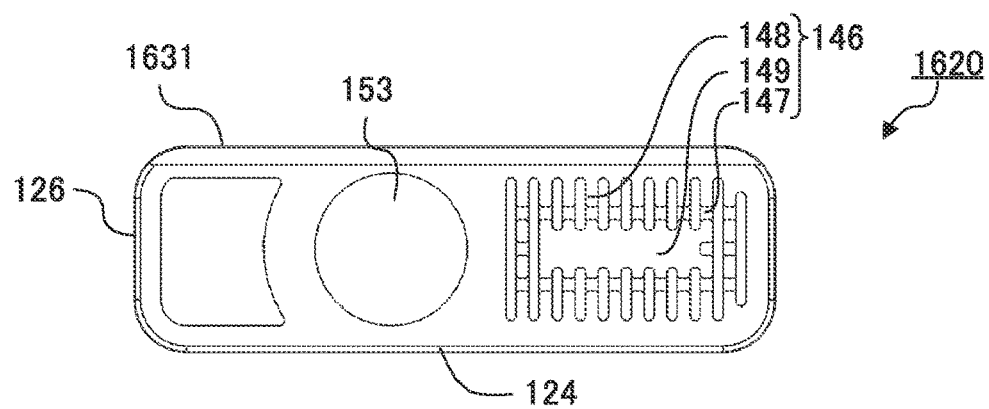
FIG. 16A
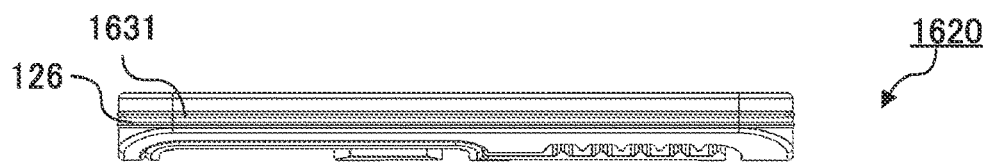
FIG. 16B
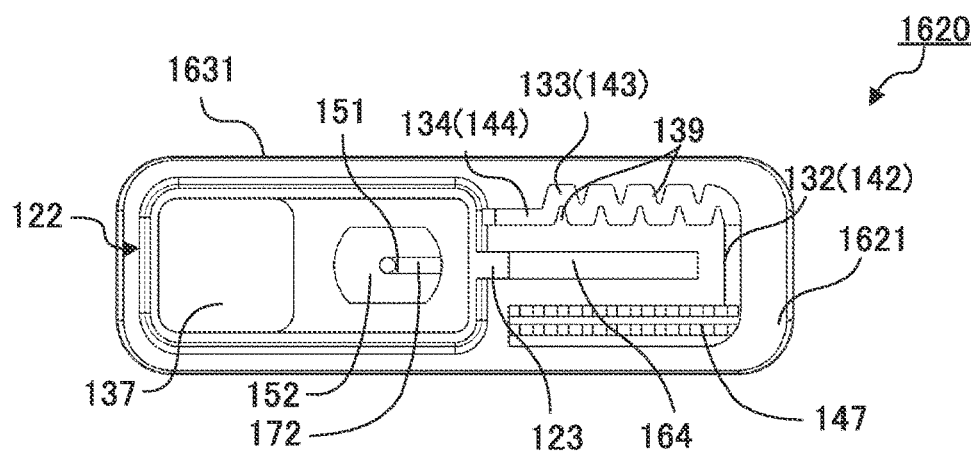
FIG. 16C
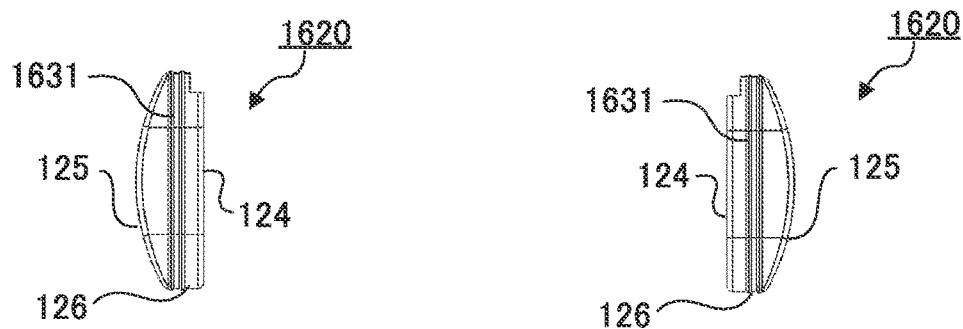
FIG. 16D
FIG. 16E

EMITTER AND DRIP IRRIGATION TUBE

TECHNICAL FIELD

The present invention relates to an emitter, and a drip irrigation tube including the emitter.

BACKGROUND ART

In the related art, drip irrigation is known as a method of growing plants. The drip irrigation method is a method in which drip irrigation tubes are placed in the soil where plants are planted and irrigation liquid such as water or liquid fertilizer is dripped from the drip irrigation tubes into the soil. In recent years, drip irrigation methods have received particular attention because of their ability to minimize the consumption of liquid for irrigation.

A drip irrigation tube has a tube with a plurality of through holes through which the irrigation liquid is discharged, and a plurality of emitters (also referred to as "drippers") joined to the inner surface of that tube to discharge the irrigation liquid from each through hole (see, for example, PTL 1).

PTL 1 discloses an emitter including a body and a flap that is movable about a hinge with respect to the body. In this emitter, the body and the flap are formed integrally with each other using the same material. In addition, the flap includes a film (diaphragm) disposed in a frame. In an operational state with the emitter that has been assembled, a recess of the body is covered with the film of the flap turned about the hinge. The recess is formed in the body with a rim provided in a frame housing as a peripheral portion. When the film of the flap is pressed against the rim, a pressure adjustment chamber is formed. The flow rate of liquid that flows out of the pressure adjustment chamber is adjusted by elastic deflection of the film in accordance with pressure variation.

CITATION LIST

Patent Literature

PTL 1
WO2017/093882

SUMMARY OF INVENTION

Technical Problem

To reduce the manufacturing cost, the emitter disclosed in PTL 1 may be formed using a resin material with a low hardness. In this case, when the liquid pressure is high, the film deformed under the pressure of the liquid may make contact with the bottom surface of the recess to deform the bottom surface of the recess, and consequently the flow rate of the liquid that flows out of the pressure adjustment chamber may not be appropriately controlled.

An object of the present invention is to provide an emitter and a drip irrigation tube that can appropriately achieve a flow rate adjustment function even when formed using a resin material with low hardness.

Solution to Problem

An emitter according to an embodiment of the present invention is configured to be joined to an inner wall surface of a tube for carrying irrigation liquid at a position corresponding to a discharging port configured to communicate between inside and outside of the tube to quantitatively discharge the irrigation liquid inside the tube from the discharging port to the outside of the tube, the emitter including: an emitter body; and a base seat part configured to be housed in the emitter body. The emitter body includes: an intake part configured to take in the irrigation liquid, a pressure reducing channel groove communicated with the intake part and configured to form a pressure reducing channel, the pressure reducing channel being configured to carry the irrigation liquid while depressurizing the irrigation liquid, a housing part communicated with the pressure reducing channel groove and configured to house the base seat part, and a diaphragm part having flexibility and configured to deform toward the base seat part when receiving a pressure of the irrigation liquid in the tube in a state where the base seat part is housed in the housing part. The base seat part includes: a base seat with which the diaphragm part under the pressure of the irrigation liquid in the tube makes contact, a communication hole whose one opening is open at the base seat, the communication hole being configured to discharge, toward the discharging port, the irrigation liquid having entered the housing part from the pressure reducing channel groove, and a deformation suppression part disposed to protrude from a surface on a side opposite to the base seat with which the diaphragm part deformed under the pressure of the irrigation liquid makes contact, the deformation suppression part being configured to suppress deformation of the base seat due to the pressure of the irrigation liquid by making contact with the tube when the diaphragm part under the pressure of the irrigation liquid is in contact with the base seat.

A drip irrigation tube according to an embodiment of the present invention includes a tube including a discharging port configured to discharge irrigation liquid; and the emitter joined at a position corresponding to the discharging port in an inner wall surface of the tube.

Advantageous Effects of Invention

According to the present invention, it is possible to provide an emitter and a drip irrigation tube that can appropriately achieve a flow rate adjustment function even when formed using a resin material with low hardness.

BRIEF DESCRIPTION OF DRAWINGS

FIGS. 14A to 14F illustrate configurations of emitters according to Modifications 1 to 3 of Embodiment 3;

FIGS. 16A to 16E illustrate a configuration of an emitter according to Modification 1 of Embodiment 4;

DESCRIPTION OF EMBODIMENTS

Embodiments of the present invention will be elaborated below with reference to the accompanying drawings.

Embodiment 1

Configurations of Drip Irrigation Tube and Emitter

Figure 1:
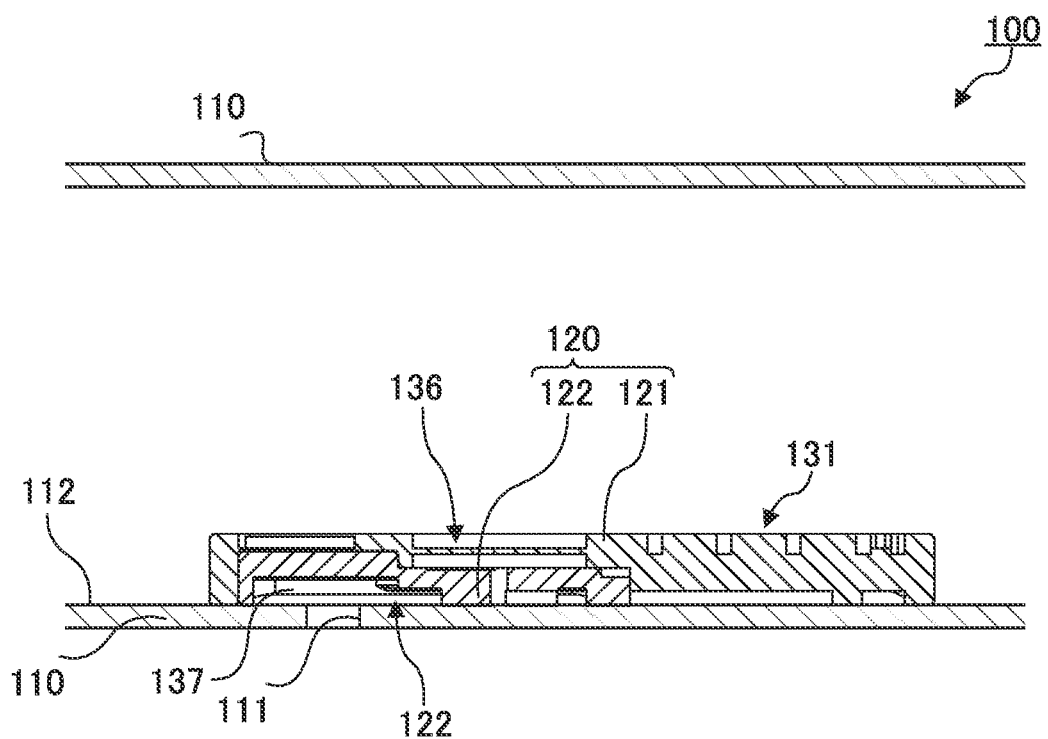
FIG. 1 is a sectional view of a drip irrigation tube according to Embodiment 1 of the present invention.

FIG. 1 is a sectional view of drip irrigation tube 100 according to Embodiment 1 of the present invention.

As illustrated in FIG. 1, drip irrigation tube 100 includes tube 110 and emitter 120.

Tube 110 is a tube for carrying irrigation liquid. Examples of the irrigation liquid include water, liquid fertilizer, agricultural chemicals and mixtures thereof. The flow direction of the irrigation liquid in tube 110 is not limited. In addition, the material of tube 110 is not limited. In the present embodiment, the material of tube 110 is polyethylene.

In the tube wall of tube 110, a plurality of discharging ports 111 for discharging irrigation liquid is formed at a predetermined interval (e.g., from 200 mm to 500 mm) in the axis direction of tube 110. The diameter of the opening of discharging port 111 is not limited as long as irrigation liquid can be discharged. In the present embodiment, the diameter of the opening of discharging port 111 is 1.5 mm. Each emitter 120 is joined at a position corresponding to discharging port 111 of inner wall surface 112. The cross-sectional shape and the cross-sectional area perpendicular to the axis direction of tube 110 are not limited as long as emitter 120 can be disposed inside tube 110 without causing liquid leakage.

Drip irrigation tube 100 is produced by joining rear surface 125 (see FIG. 2) of emitter 120 to inner wall surface 112. The method of joining tube 110 and emitter 120 is not limited. For example, tube 110 and emitter 120 are joined by welding of the resin material of tube 110 or emitter 120, bonding with an adhesive agent, and the like. Discharging port 111 may be formed after or before tube 110 and emitter 120 are joined.

Figure 2A:
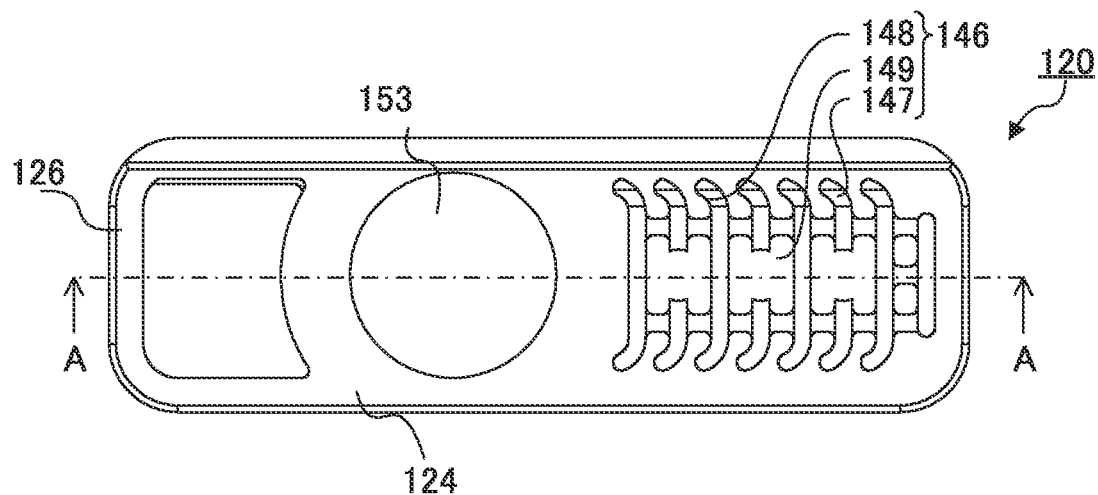
FIGS. 2A to 2D illustrate a configuration of an emitter according to Embodiment 1 after a base seat part is housed in a housing part.
Figure 2B:
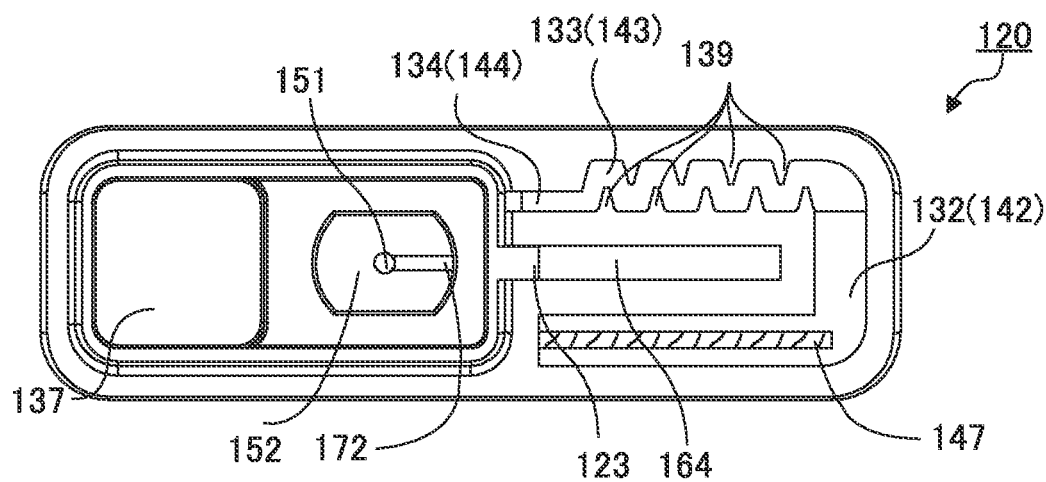
Figure 2C:
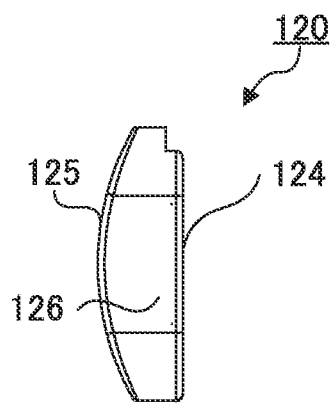
Figure 2D:
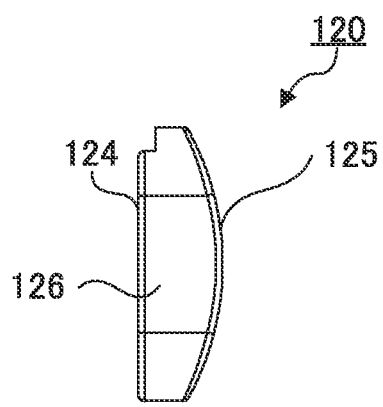
Figure 3A:
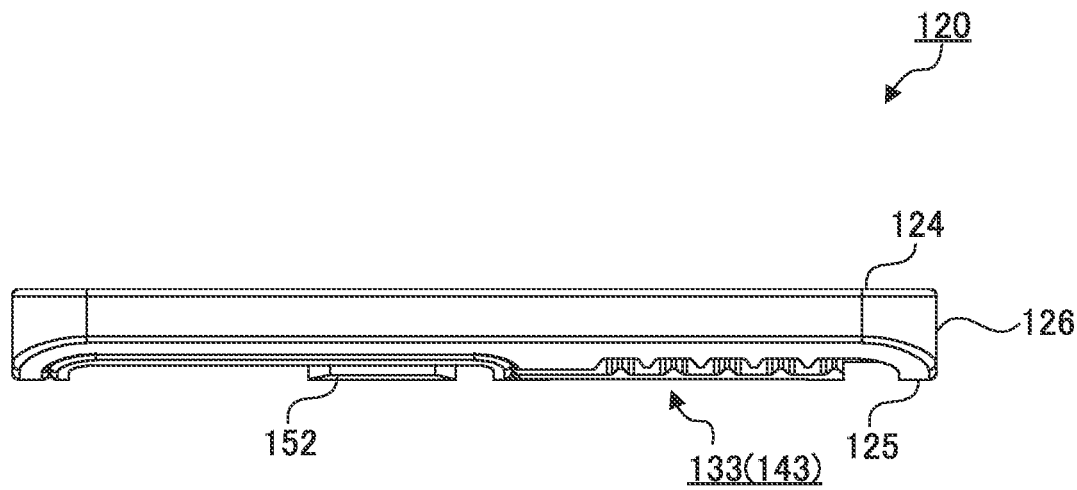
FIGS. 3A and 3B illustrate a configuration of the emitter according to Embodiment 1 after the base seat part is housed in the housing part.
Figure 3B:
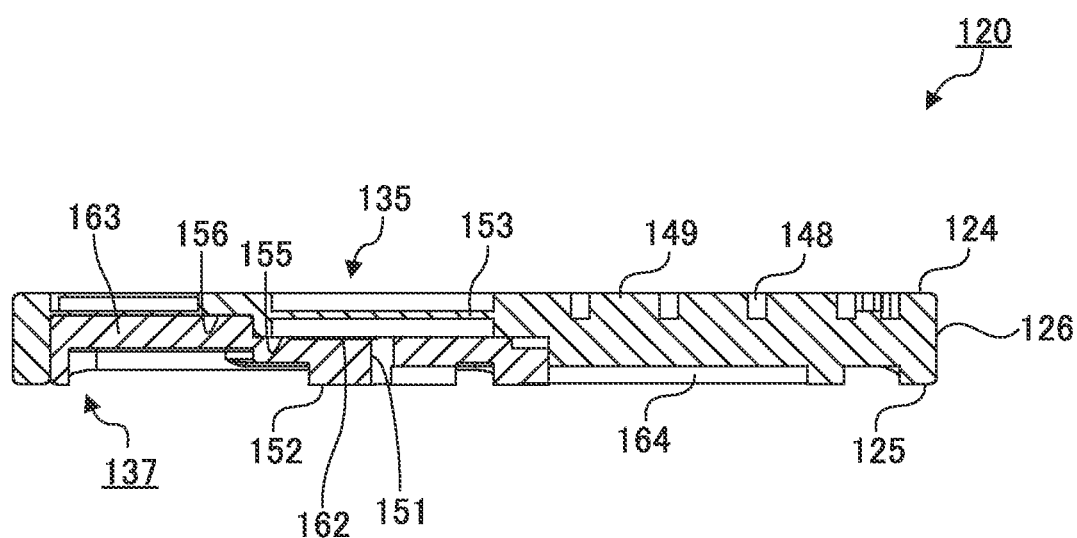
Figure 4A:
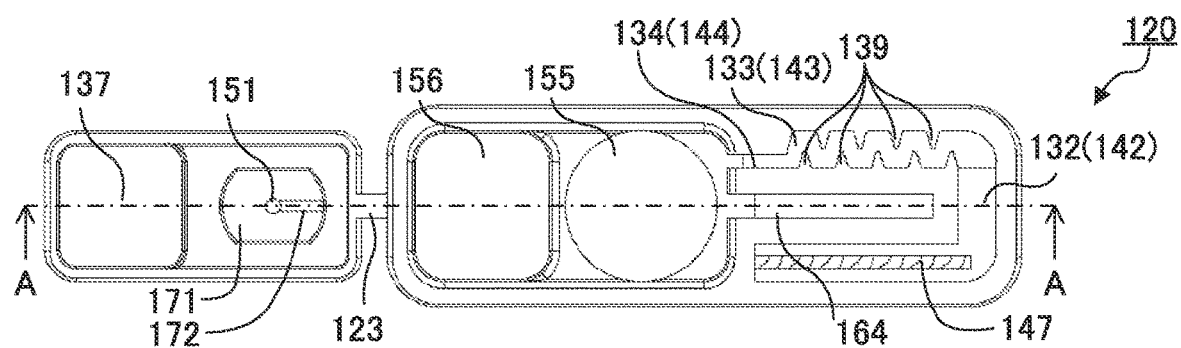
FIGS. 4A to 4D illustrate a configuration of the emitter according to Embodiment 1 before the base seat part is housed in the housing part.
Figure 4B:
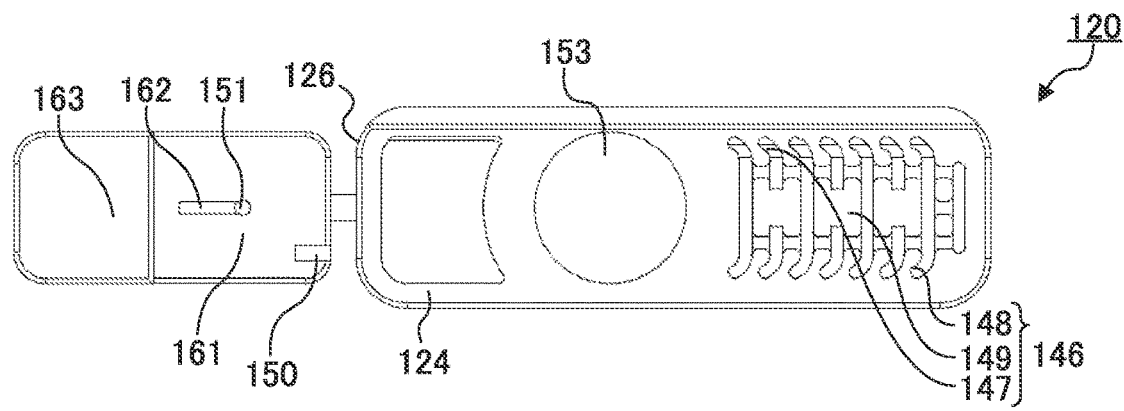
Figure 4C:
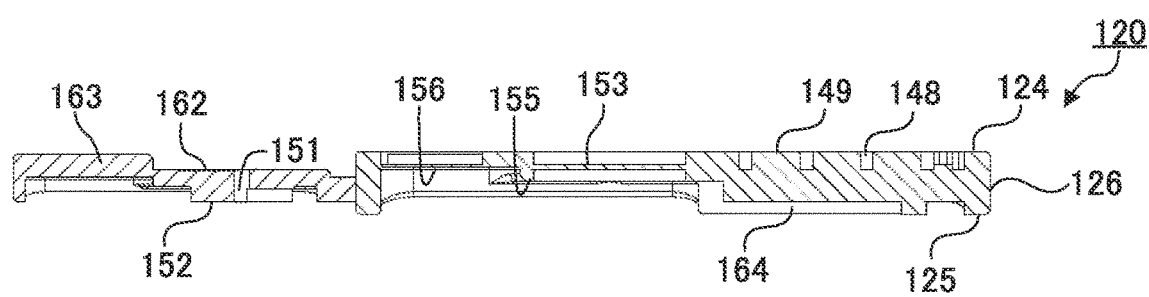
Figure 4D:
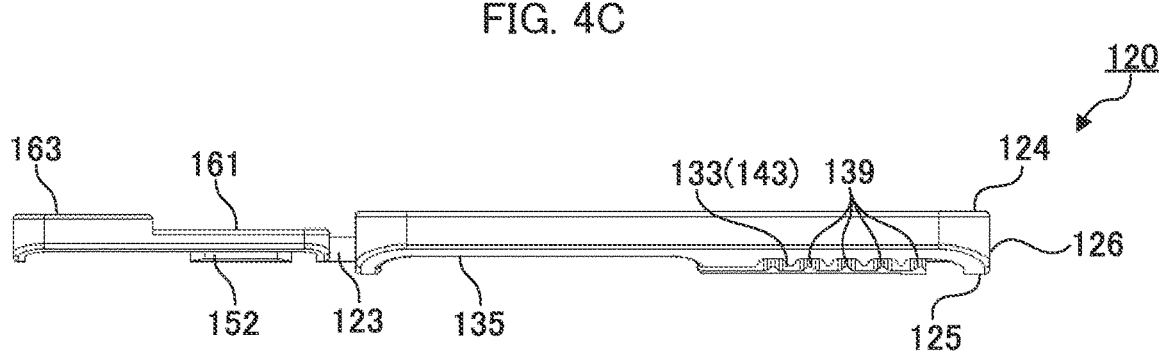

FIGS. 2A to 3B illustrate a configuration of emitter 120 after base seat part 122 is housed in housing part 135. FIG. 2A is a plan view of emitter 120, FIG. 2B is a bottom view, FIG. 2C is a left side view, and FIG. 2D is a right side view. FIG. 3A is a front view, and FIG. 3B is a sectional view taken along line A-A of FIG. 2A. FIGS. 4A to 4D illustrate a configuration of emitter 120 before base seat part 122 is housed in housing part 135. FIG. 4A is a bottom view of emitter 120, FIG. 4B is a plan view, FIG. 4C is a sectional view taken along line A-A of FIG. 4A, and FIG. 4D is a front view.

As illustrated in FIG. 1, emitter 120 is joined to inner wall surface 112 of tube 110 to cover discharging port 111. The shape of emitter 120 is not limited as long as it can make intimate contact with inner wall surface 112 and cover discharging port 111. In the present embodiment, in the cross-section of emitter 120 in the direction perpendicular to the axis direction of tube 110, the shape of rear surface 125 joined to inner wall surface 112 is a substantially arc shape that protrudes toward inner wall surface 112 to match inner wall surface 112. In plan view, the shape of emitter 120 is a substantially rectangular shape with chamfered four corners as illustrated in FIG. 2A. The size of emitter 120 is not limited, and may be appropriately determined based on the desired discharge rate of the irrigation liquid from discharging port 111. In the present embodiment, emitter 120 has a length of 19 mm in the long side direction, a length of 8 mm in the short side direction, and a height of 2.7 mm.

In the present embodiment, emitter 120 is formed of an elastic material. Examples of the material of emitter 120 include resin, elastomer and rubber. Examples of the resin include polyethylene and silicone. The flexibility of emitter 120 can be adjusted by the elastic material used. Examples of the adjustment method of the flexibility of emitter 120 include selection of elastic resins and adjustment of the mixing ratio of an elastic resin with respect to a hard resin material. The index representing the hardness of the material of emitter 120 includes the durometer hardness defined in JIS K6253-3 (2012). The hardness of the material of emitter 120 is about D60 in durometer hardness. Note that the durometer hardness may be type A, type D, and type E depending on the type of durometer used for the measurement. For example, when a type D durometer is used and hardness 60 is indicated, durometer hardness D60 is obtained. Regarding the durometer hardness, when the types have the same numerical value, the type D is the hardest, and the type A and the type E are softer in that order. In the present embodiment, when the material has a durometer hardness D60 or smaller, the effect of suppressing the deformation of base seat 161 is favorably ensured.

As illustrated in FIGS. 1 to 4D, emitter 120 includes emitter body 121 and base seat part 122 housed in emitter body 121. Base seat part 122 is housed in housing part 135 of emitter body 121 from rear surface 125 side opposite to discharging port 111 before emitter 120 is joined to tube 110. Emitter body 121 and base seat part 122 may be formed integrally with each other, or may be molded as separate members. In the present embodiment, emitter body 121 and base seat part 122 are molded in a state where they are connected with each other through hinge part 123. The boundary between the emitter body 121 and hinge part 123 is disconnected to house base seat part 122 in housing part 135. The method for forming emitter body 121, base seat part 122, and hinge part 123 integrally with each other is not limited. In the present embodiment, emitter body 121, base seat part 122 and hinge part 123 are molded integrally with each other by injection molding.

Emitter body 121 includes intake part 131, first connecting groove 132 serving as first connecting channel 142, pressure reducing groove (pressure reducing channel groove) 133 serving as pressure reducing channel 143, second connecting groove 134 serving as second connecting channel 144, and flow rate adjusting part 136. When base seat part 122 is housed in housing part 135 of emitter body 121, flow rate adjusting part 136 and discharging part 137 are formed. Intake part 131 opens at front surface 124 of emitter body 121. First connecting groove 132, pressure reducing groove 133, second connecting groove 134 and housing part 135 are open at rear surface 125 of emitter body 121.

When emitter 120 is joined to tube 110, first connecting groove 132, pressure reducing groove 133 and second connecting groove 134 serve as first connecting channel 142, pressure reducing channel 143 and second connecting channel 144, respectively. With this configuration, a channel composed of intake part 131, first connecting channel 142, pressure reducing channel 143, second connecting channel 144, flow rate adjusting part 136 and discharging part 137, and configured to connect intake part 131 and discharging part 137 is formed. This channel carries irrigation liquid from intake part 131 to discharging part 137.

Intake part 131 is disposed in a half region of front surface 124 of emitter body 121. The number of intake parts 131 is not limited. In the present embodiment, one intake part 131 is disposed in one half surface in the longitudinal axis direction in emitter 120 (FIG. 2A). In front surface 124, flow rate adjusting part 136 is disposed in the region where intake part 131 is not disposed (FIG. 1). Intake part 131 includes intake side screen part 146 and intake through hole 147.

Intake side screen part 146 prevents entry into intake through hole 147 of floating matters in the irrigation liquid taken into emitter 120. Intake side screen part 146 is open to interior of tube 110, and includes intake recess 148 and ridge 149.

Intake recess 148 is a recess formed almost entirely in the region of the half surface where diaphragm part 153 is not disposed in front surface 124 of emitter 120. The depth of intake recess 148 is not limited, and is appropriately set in accordance with the size of emitter 120. Ridge 149 is formed on the bottom surface of intake recess 148. In addition, intake through hole 147 is formed in the bottom surface of intake recess 148.

Ridge 149 is disposed on the bottom surface of intake recess 148. The arrangement and the number of ridges 149 are not limited as long as entry of floating matters in the irrigation liquid can be prevented while taking in the irrigation liquid from the opening side of intake recess 148. In the present embodiment, a plurality of ridges 149 is arranged in the longitudinal axial direction of intake recess 148. In addition, ridge 149 may be formed such that the width decreases from front surface 124 of emitter 120 toward the bottom surface of intake recess 148, or that the width does not change from front surface 124 of emitter 120 toward the bottom surface of intake recess 148.

Intake through hole 147 is formed in the bottom surface of intake recess 148. The shape and the number of intake through holes 147 are not limited as long as the irrigation liquid taken into intake recess 148 can be taken into emitter body 121. In the present embodiment, intake through hole 147 is a single long hole formed along the longitudinal axial direction in the bottom surface of intake recess 148. Since the long hole is covered with the plurality of ridges 149, one intake through hole 147 appears to be divided into many through holes as viewed from the front side.

Irrigation liquid flowing inside tube 110 is taken into emitter 120 while entry of floating matters into intake through hole 147 is prevented by intake side screen part 146.

First connecting groove 132 (first connecting channel 142) connects intake through hole 147 (intake part 131) and pressure reducing groove 133. First connecting groove 132 is formed along the outer edge of rear surface 125 of emitter 120. One end portion of first connecting groove 132 is connected to pressure reducing groove 133. When tube 110 and emitter 120 are joined to each other, first connecting groove 132 and inner wall surface 112 of tube 110 form first connecting channel 142. The irrigation liquid taken from intake part 131 flows toward pressure reducing channel 143 through first connecting channel 142.

Pressure reducing groove 133 (pressure reducing channel 143) connects first connecting groove 132 (first connecting channel 142) and second connecting channel 144. Pressure reducing groove 133 (pressure reducing channel 143) guides, to flow rate adjusting part 136, the irrigation liquid taken from intake part 131 while depressurizing the irrigation liquid. Pressure reducing groove 133 is disposed along the longitudinal axial direction at one end portion of rear surface 125 in the minor axis direction. The upstream end of pressure reducing groove 133 is connected to first connecting groove 132, and the downstream end of pressure reducing groove 133 is connected to second connecting groove 134 communicated with flow rate adjusting part 136. The shape of pressure reducing groove 133 is not limited as long as the above-described function can be ensured. In the present embodiment, pressure reducing groove 133 has a zigzag shape in plan view. In pressure reducing groove 133, protrusions 139, each of which has a substantially triangular prism shape protruding from the inner surface, alternate along the flow direction of the irrigation liquid. Each protrusion 139 is disposed such that its tip end does not cross the central axis of pressure reducing groove 133 in plan view. When tube 110 and emitter 120 are joined to each other, pressure reducing groove 133 and inner wall surface 112 of tube 110 form pressure reducing channel 143. The irrigation liquid taken from intake part 131 is depressurized by pressure reducing channel 143 and guided to flow rate adjusting part 136.

Second connecting groove 134 (second connecting channel 144) connects pressure reducing groove 133 (pressure reducing channel 143) and flow rate adjusting part 136. Second connecting groove 134 is a groove that is formed in a straight line shape along the longitudinal axial direction of emitter 120 on rear surface 125 side of emitter 120. The upstream end of second connecting groove 134 is connected to pressure reducing groove 133, and the downstream end of second connecting groove 134 is connected to flow rate adjusting part 136 (housing part 135). When tube 110 and emitter 120 are joined to each other, second connecting groove 134 and inner wall surface 112 of tube 110 form second connecting channel 144. The irrigation liquid depressurized by pressure reducing channel 143 flows to flow rate adjusting part 136 through second connecting channel 144.

Flow rate adjusting part 136 adjusts the flow rate of incoming irrigation liquid. Flow rate adjusting part 136 is disposed in a region where intake part 131 is not provided in emitter 120. Flow rate adjusting part 136 includes housing part 135, base seat 161, communication hole 151, deformation suppression part 152, and diaphragm part 153. In addition, base seat part 122 includes base seat 161, communication hole 151, connecting groove 162, deformation suppression part 152, and protrusion 163.

Housing part 135 includes first recess 155 having a substantially columnar shape, and second recess 156 disposed next to first recess 155 and having a substantially quadrangular prism shape. In first recess 155, base seat 161 (see FIG. 1) is disposed to adjust the discharging amount of irrigation liquid coming from second connecting channel 122 and discharged from discharging port 111 of tube 110. Protrusion 163 next to base seat 161 is fit to second recess 156. After base seat 161 is disposed to first recess 155 and protrusion 163 is fit to second recess 156, emitter 120 is joined to inner wall surface 112 of tube 110.

Base seat 161 is a region with which diaphragm part 153 deformed under the pressure of the irrigation liquid makes contact. The shape of base seat 161 is not limited. The shape of base seat 161 may be a curved surface or a flat surface. In the present embodiment, the shape of base seat 161 is a flat surface. Cutout groove 150 is formed in the flat surface part where base seat 161 is disposed.

Cutout groove 150 is used for appropriately guiding, to first recess 155, irrigation liquid from second connecting channel 134. The shape of cutout groove 150 is not limited as long as the above-mentioned function can be ensured. In the present embodiment, cutout groove 150 is formed in a linear shape.

Communication hole 151 is used for discharging, toward discharging port 111, irrigation liquid entering housing part 135 from pressure reducing channel 143. In the present embodiment, communication hole 151 is open at a center portion of base seat 161. The size of the opening of communication hole 151 is not limited and may be appropriately set.

Connecting groove 162 is a groove for guiding irrigation liquid to communication hole 151 even in a state where diaphragm part 153 is in contact with base seat 161. One end portion of connecting groove 162 is communicated with communication hole 151. The other end portion of connecting groove 162 is disposed outside the outer edge of the contact region of base seat 161 in the state where diaphragm part 153 is in contact with base seat 161.

Deformation suppression part 152 makes contact with tube 110 to suppress the deformation of base seat 161 when diaphragm part 153 is in contact with base seat 161 under the pressure of the irrigation liquid. Deformation suppression part 152 is disposed to protrude from the surface on the side opposite to the surface of base seat 161 with which diaphragm part 153 deformed under the pressure of the irrigation liquid makes contact. Deformation suppression part 152 is disposed at the periphery of the opening of communication hole 151 on discharging port 111 side. The shape of deformation suppression part 152 is not limited as long as the deformation of base seat 161 can be suppressed. In the present embodiment, the shape of deformation suppression part 152 includes deformation suppression part body 171 having a columnar shape, and ejection groove 172 formed in deformation suppression part body 171. In the present embodiment, in plan view, deformation suppression part body 171 has a shape with opposite two arcs and two parallel straight lines connecting the both ends of the arcs. The height of deformation suppression part body 171 is not limited as long as the deformation of base seat 161 can be suppressed. The height of deformation suppression part body 171 may be set such that it makes contact with the inner wall surface of tube 110 when disposed to tube 110, or that it does not makes contact with the inner wall surface of tube 110 when disposed to tube 110.

Ejection groove 172 can appropriately guide irrigation liquid to discharging port 137 even in a state where deformation suppression part 152 is in contact with tube 110. Ejection groove 172 is formed in the bottom surface of deformation suppression part body 171. One end portion of ejection groove 172 is communicated with communication hole 151, and the other end portion reaches the side surface of deformation suppression part body 171. As illustrated in FIG. 2B, preferably, ejection groove 172 reaches the surface on the side opposite to discharging part 137 in deformation suppression part body 171. When ejection groove 172 is formed in such a direction, external foreign matters such as sand and tree root that entered tube 110 less likely cause clogging of ejection groove 171.

As illustrated in FIG. 1, when emitter 120 is joined to inner wall surface 112 of tube 110, base seat part 122 disposed in housing part 135 and diaphragm part 153 facing base seat 161 form flow rate adjusting part 136 that adjusts the flow rate of the irrigation liquid discharged from communication hole 151 of emitter 120 (base seat 161) in accordance with the pressure of the irrigation liquid in tube 110. In the present embodiment, diaphragm part 153 has a circular shape in plan view. In the present embodiment, diaphragm part 153 is formed integrally with the other configurations (intake part 131, first connecting channel 142, pressure reducing channel 143, and second connecting channel 144) of emitter body 121.

Diaphragm part 153 is formed integrally with the other configuration of emitter body 121, and thus has flexibility. In the state where emitter 120 is joined to inner wall surface 112 of tube 110, diaphragm part 153 deforms toward base seat 161 under the pressure of the irrigation liquid in tube 110.

In the present embodiment, as described above, emitter body 121 and base seat part 122 are manufactured in a state where they are connected to each other through hinge part 123. During manufacture of emitter 120, hinge part 123 connects emitter body 121 and base seat 161. The shape and the size of hinge part 123 may be appropriately set as long as the above-described function can be ensured. In the present embodiment, hinge part 123 is connected to side surface 126 contiguous with rear surface 125. Hinge part 123 may be disposed at the side surface located at either end in the longitudinal axial direction of emitter body 121 (the flow direction of the irrigation liquid), or may be located at side surface 126 at either end in the minor axis direction of emitter body 121. Preferably, to prevent blockage of the flow of the irrigation liquid, hinge part 123 is connected to side surface 126 on the upstream side or the downstream side in the flow direction of the irrigation liquid.

When base seat part 122 is housed in housing part 135, hinge part 123 may be bent or may be separated away from emitter body 121 and base seat 161. In the present embodiment, hinge part 123 is cut away from emitter body 121. Hinge part 123 is housed in groove 164 formed in rear surface 125 of emitter body 121. In the state where hinge part 123 is housed in groove 164 formed in rear surface 125 of emitter body 121, rear surface 125 of emitter 120 is appropriately joined to inner wall surface 112 of tube 110.

When base seat part 122 is housed in housing part 135, the cut hinge part 123 is housed in groove 164. The shape of groove 164 is not limited as long as hinge part 123 can be housed therein and irrigation liquid is not leaked. In the present embodiment, groove 164 is slightly smaller than hinge part 123. When emitter 120 is joined to tube 110, base seat 161 is housed in housing part 135 and hinge part 123 is housed in groove 164. At this time, hinge part 123 is housed by press-fitting hinge part 123 to groove 164 because groove 164 is slightly smaller than hinge part 123.

Discharging part 137 temporarily stores the irrigation liquid from ejection groove 172. The irrigation liquid reaching discharging part 137 is discharged to the outside from discharging port 111.

Now an operation of diaphragm part 153 in accordance with the pressure of the irrigation liquid in tube 110 is described.

Before irrigation liquid is fed into tube 110, the pressure of the irrigation liquid is not applied to diaphragm part 153, and diaphragm part 153 is not deformed (see FIG. 1).

When the feeding of irrigation liquid into tube 110 is started, the pressure of the irrigation liquid in tube 110 increases and diaphragm part 153 deforms. When the pressure of the irrigation liquid is relatively low, the deformation of diaphragm part 153 is relatively small, and diaphragm part 153 does not make contact with base seat 161. In this state, communication hole 151 of base seat 161 is not closed, and therefore the irrigation liquid flowing into the space between diaphragm part 153 and base seat 161 from second connecting channel 144 is discharged to discharging part 137 from communication hole 151.

When the pressure of the irrigation liquid exceeds a set value, the deformation amount of diaphragm part 153 further increases, and diaphragm part 153 makes intimate contact with base seat 161. It should be noted that even when diaphragm part 153 is in intimate contact with base seat 161, connecting groove 162 is not closed. Therefore, the irrigation liquid flowing into the space from second connecting channel 144 flows through connecting groove 162 and is then discharged from communication hole 151 to discharging part 137. Thus, even when diaphragm part 153 is in intimate contact with base seat 161, irrigation liquid of a certain amount or more is discharged to discharging part 137.

Here, in the case where the hardness of emitter 120 is low as in the present embodiment, the greater the deformation amount of diaphragm part 153, the greater the pressure of diaphragm part 153 against base seat 161. In this case, when the pressure is excessively high, base seat 161 may deform toward discharging port 111. To suppress such deformation of base seat 161, emitter 120 according to the present embodiment includes deformation suppression part 152.

In the present embodiment, even when the deformation amount of diaphragm part 153 increases, deformation suppression part 152 suppresses the deformation of base seat 161. More specifically, the pressure of diaphragm part 153 against base seat 161 is canceled by the reactive force that is generated when the bottom surface of deformation suppression part 152 makes contact with the inner wall surface of tube 110.

With this configuration, regardless of the pressure of the irrigation liquid in tube 110, irrigation liquid of a certain amount or greater can be reliably discharged from communication hole 151. That is, drip irrigation tube 100 according to the present embodiment can discharge irrigation liquid of a certain amount or greater to the outside of tube 110 regardless of whether the pressure of the irrigation liquid is high or low.

Effect

As described above, emitter 120 according to the present embodiment includes deformation suppression part 152, and thus the deformation of base seat 161 due to contact of diaphragm part 153 deformed under the pressure of the irrigation liquid can be suppressed. Thus, the flow rate adjustment function of emitter 120 can be appropriately achieved.

Modification

Deformation suppression part 152 is not limited as long as the above-described function can be ensured.

Figure 5A:
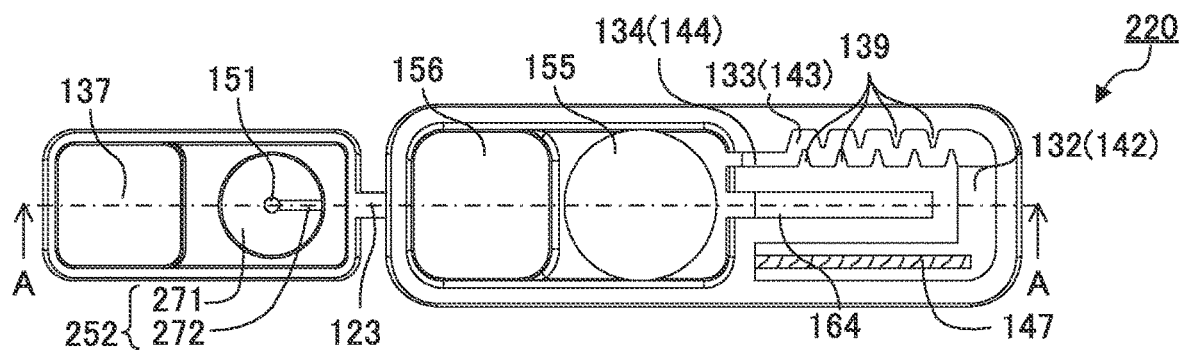
FIGS. 5A to 5D illustrate a configuration of an emitter according to a modification of Embodiment 1.
Figure 5B:
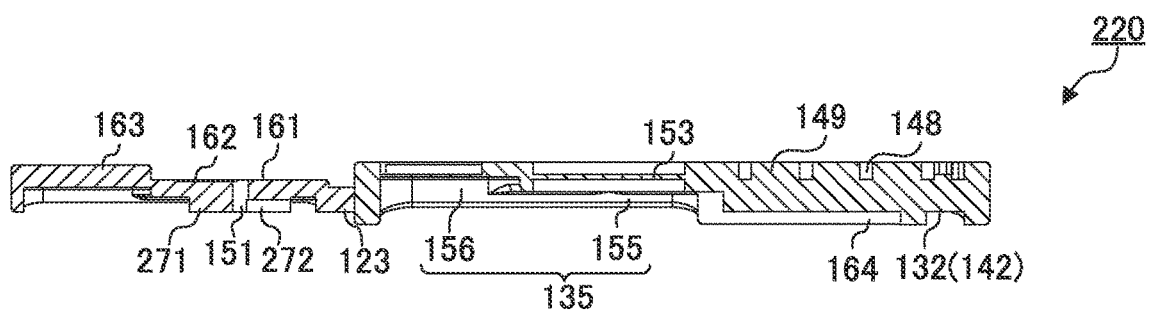

As illustrated in FIGS. 5A and 5B, deformation suppression part 252 in emitter 220 may include deformation suppression part body 271 having a circular shape in plan view and ejection groove 272 formed in deformation suppression part body 271.

Figure 5C:
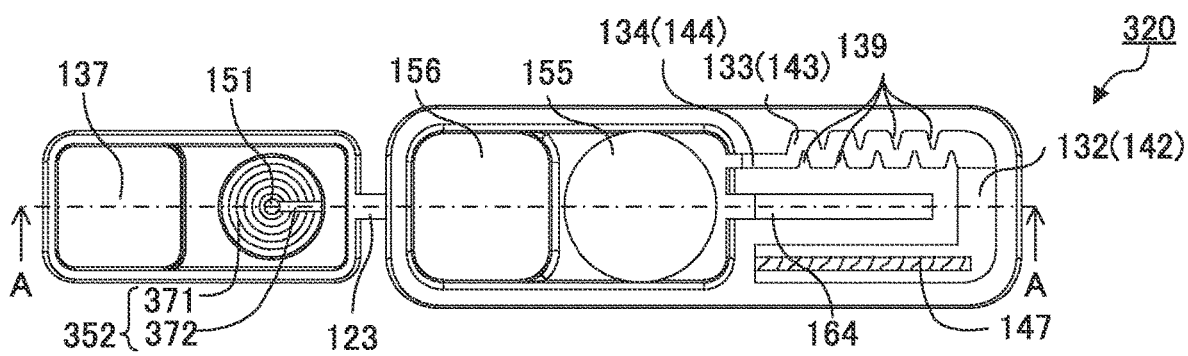
Figure 5D:
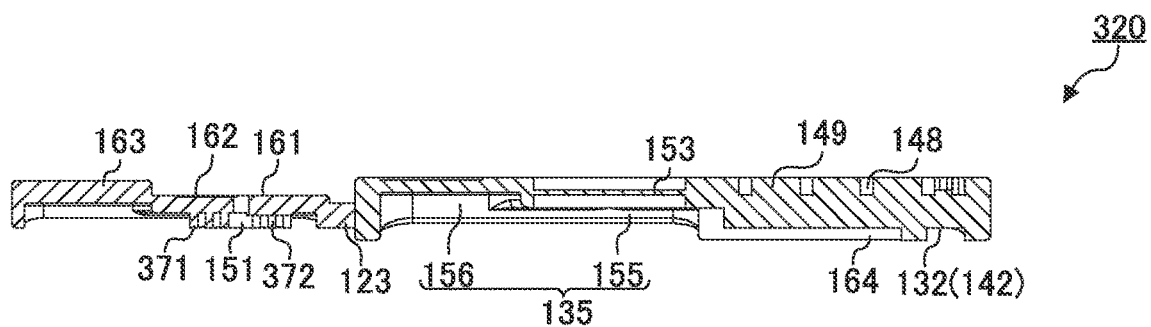

As illustrated in FIGS. 5C and 5D, deformation suppression part 352 in emitter 320 may include deformation suppression part body 371 and ejection groove 372. Deformation suppression part body 371 is a plurality of annular protrusions disposed in a nesting form. Each of the plurality of annular protrusions includes a cutout part. A plurality of the cutout parts functions as ejection groove 372.

Figure 6A:
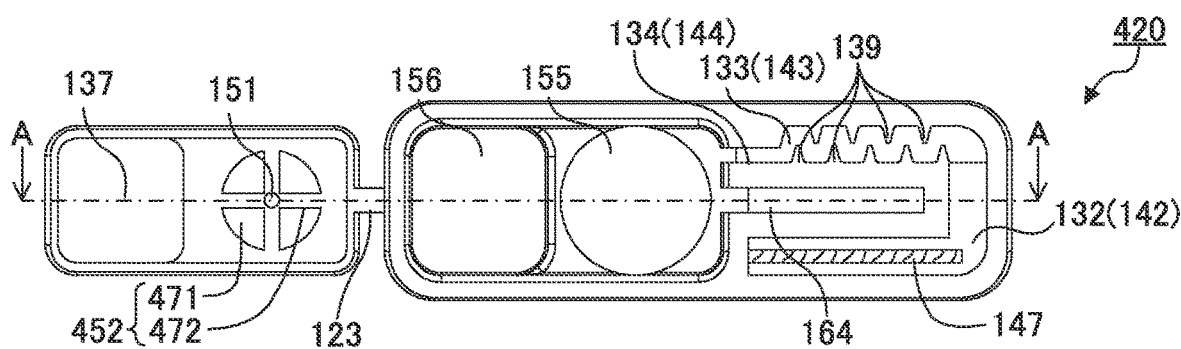
FIGS. 6A to 6D illustrate a configuration of an emitter according to a modification of Embodiment 1.
Figure 6B:
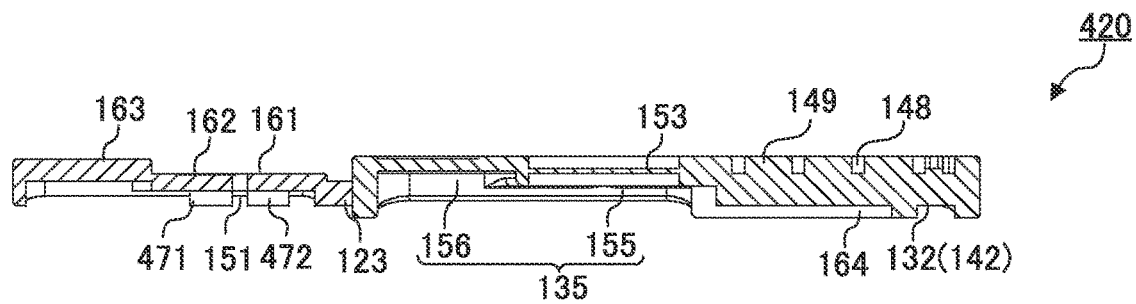

As illustrated in FIGS. 6A and 6B, deformation suppression part 452 in emitter 420 may include deformation suppression part body 471 and ejection groove 472. Deformation suppression part body 471 is a plurality of protrusions each of which has the bottom surface of a circular sector with a center angle of 90°. The plurality of protrusions are separated away from each other with communication hole 151 at the center. The region between two separate protrusions functions as ejection groove 472.

Figure 6C:
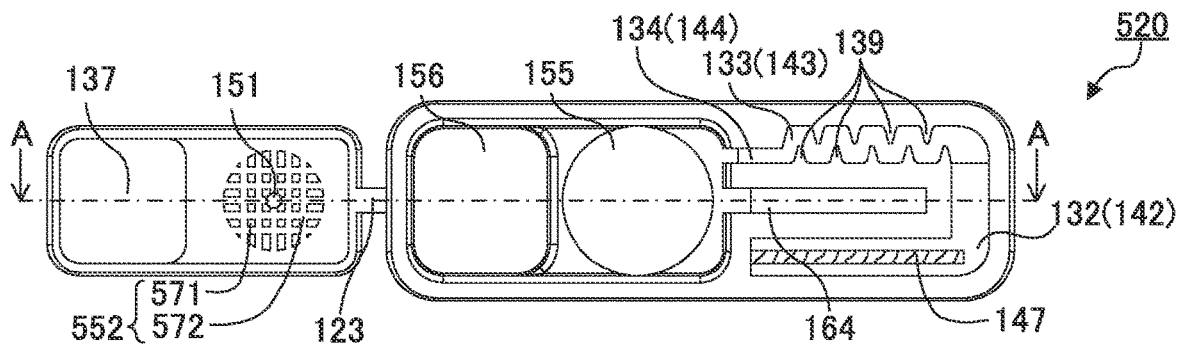
Figure 6D:
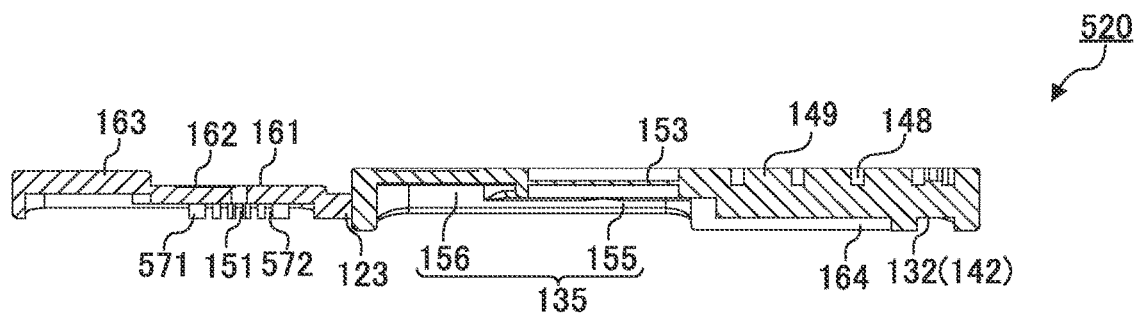

As illustrated in FIGS. 6C and 6D, deformation suppression part 552 in emitter 520 may include deformation suppression part body 571 and ejection groove 572. Deformation suppression part body 571 includes a plurality of protrusions. The plurality of protrusions is disposed in a rectangular grid pattern in the flat surface at which communication hole 151 opens. Each region between the plurality of protrusions functions as ejection groove 572.

Figure 7A:
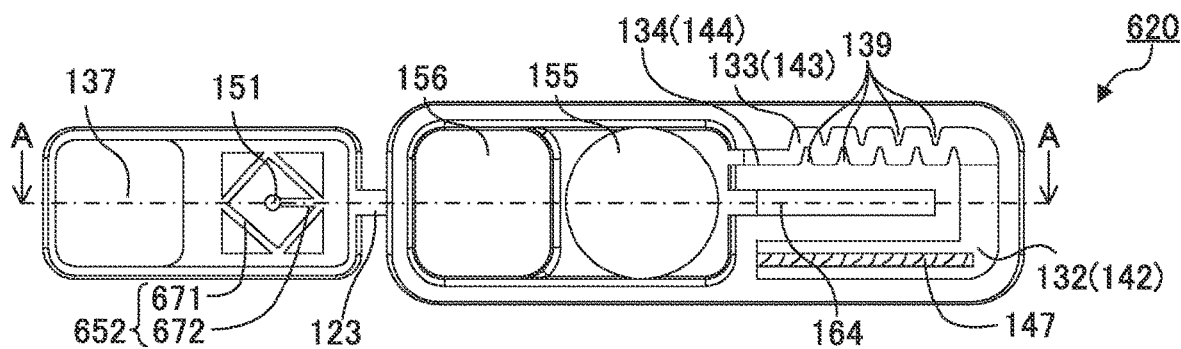
FIGS. 7A to 7D illustrate a configuration of an emitter according to a modification of Embodiment 1.
Figure 7B:
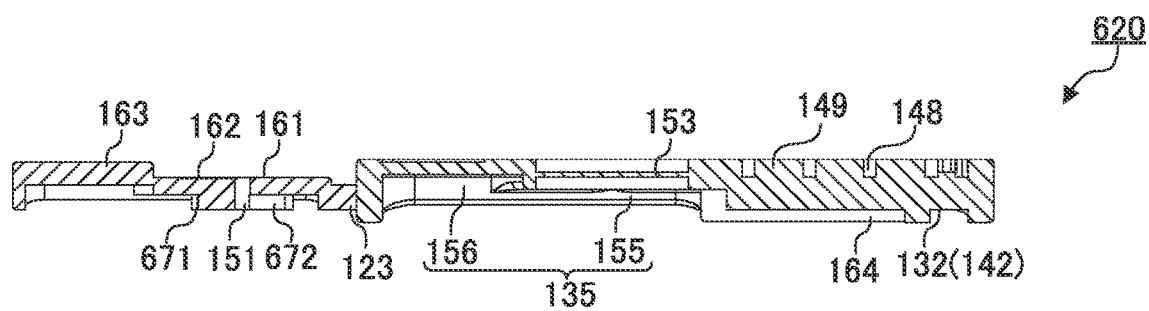

As illustrated in FIGS. 7A and 7B, deformation suppression part 652 in emitter 620 may include deformation suppression part body 671 and ejection groove 672. Deformation suppression part body 672 includes a plurality of protrusions. The plurality of protrusions has a shape of a column with a square bottom surface. Ejection groove 672 includes a plurality of first grooves each connecting the center portions of adjacent two sides of the square and a second groove connecting one end portion of the groove.

Figure 7C:
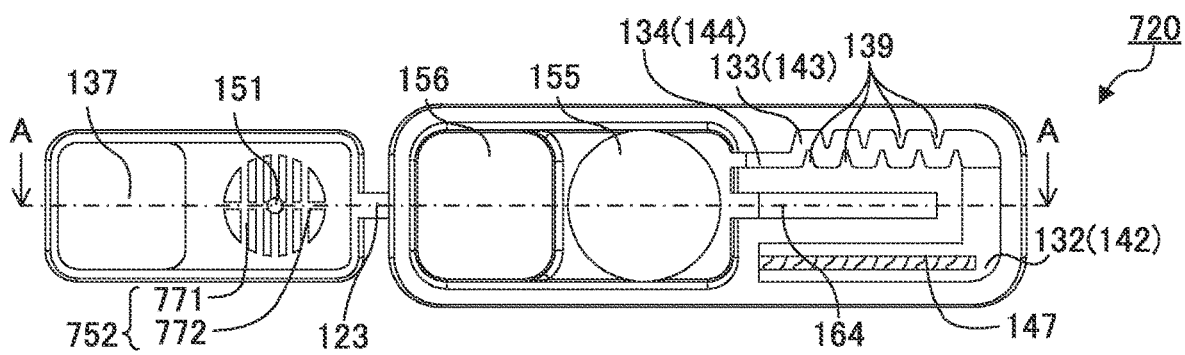
Figure 7D:
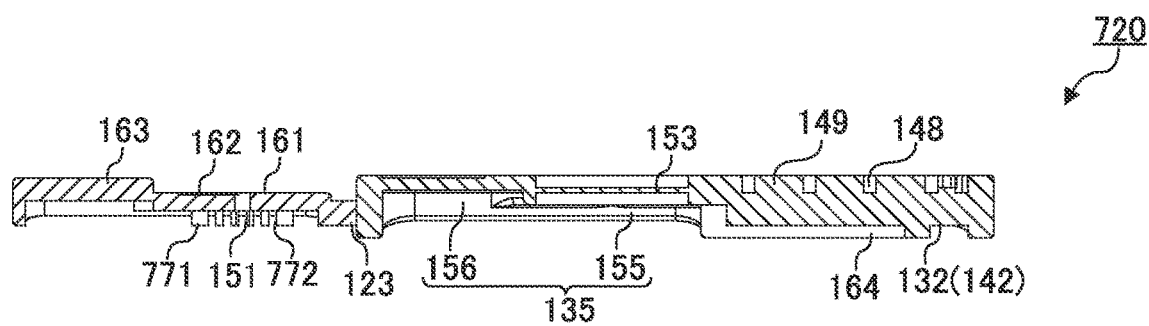

As illustrated in FIGS. 7C and 7D, deformation suppression part 752 in emitter 720 may include deformation suppression part body 771 and ejection groove 772. Deformation suppression part body 771 includes a plurality of protrusions. In the flat surface at which communication hole 151 opens, the plurality of protrusions is arranged in the longitudinal axial direction so as to extend along the minor axis direction. The region between the plurality of protrusions functions as ejection groove 772.

Figure 8A:
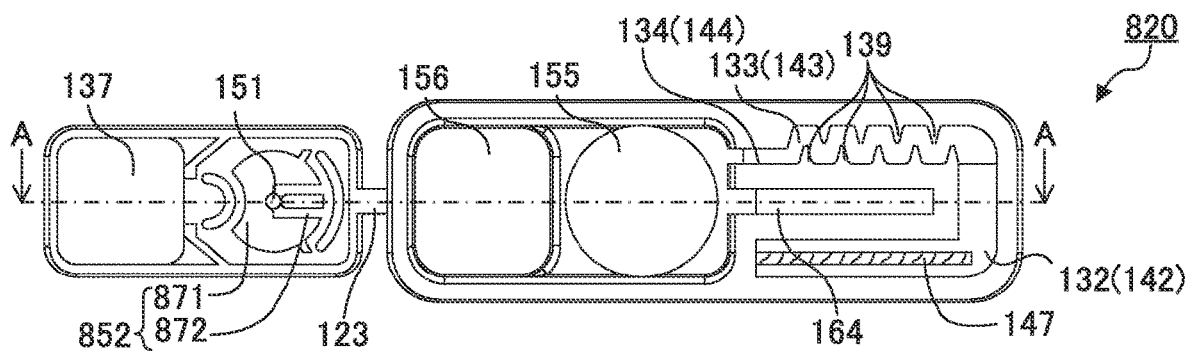
FIGS. 8A to 8C illustrate a configuration of an emitter according to a modification of Embodiment 1.
Figure 8B:
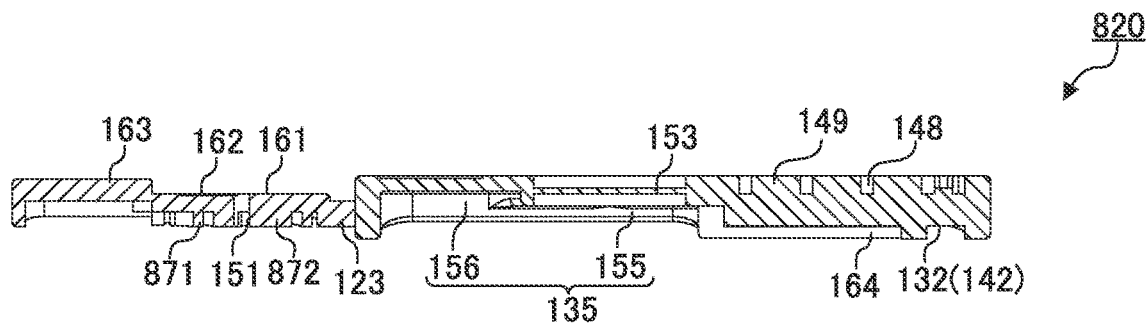

As illustrated in FIGS. 8A and 8B, deformation suppression part 852 in emitter 820 may include deformation suppression part body 871 and ejection groove 872.

Figure 8C:
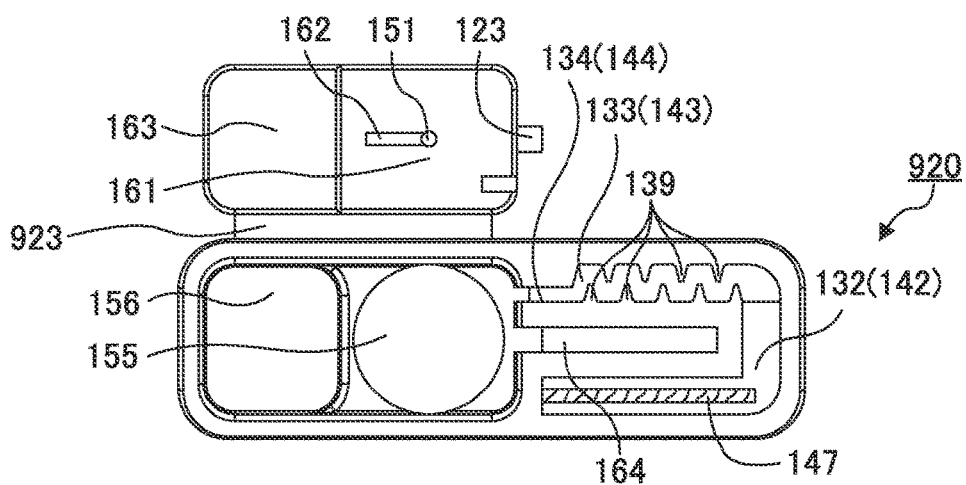

As illustrated in FIG. 8C, hinge part 923 in emitter 920 according to the present modification may be disposed at surface 126 located at either end in the minor axis direction of emitter body 121.

Embodiment 2

A drip irrigation tube according to Embodiment 2 differs from drip irrigation tube 100 according to Embodiment 1 only in configuration of emitter 1120. In view of this, the emitter 1120 of the drip irrigation tube according to Embodiment 2 is described below.

Configuration of Emitter

Figure 9A:
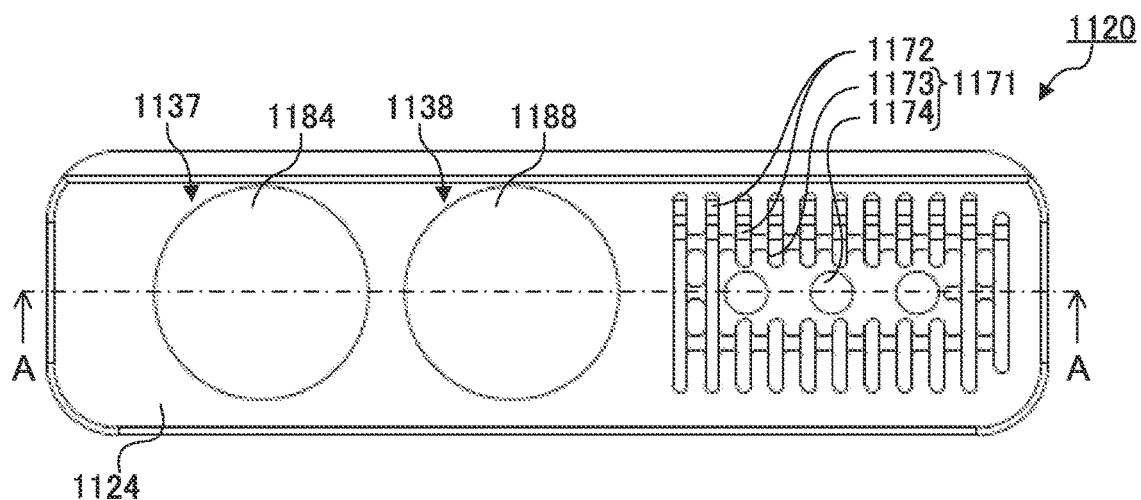
FIGS. 9A to 9D illustrate a configuration of an emitter according to Embodiment 2 after a base seat part is housed in a housing part.
Figure 9B:
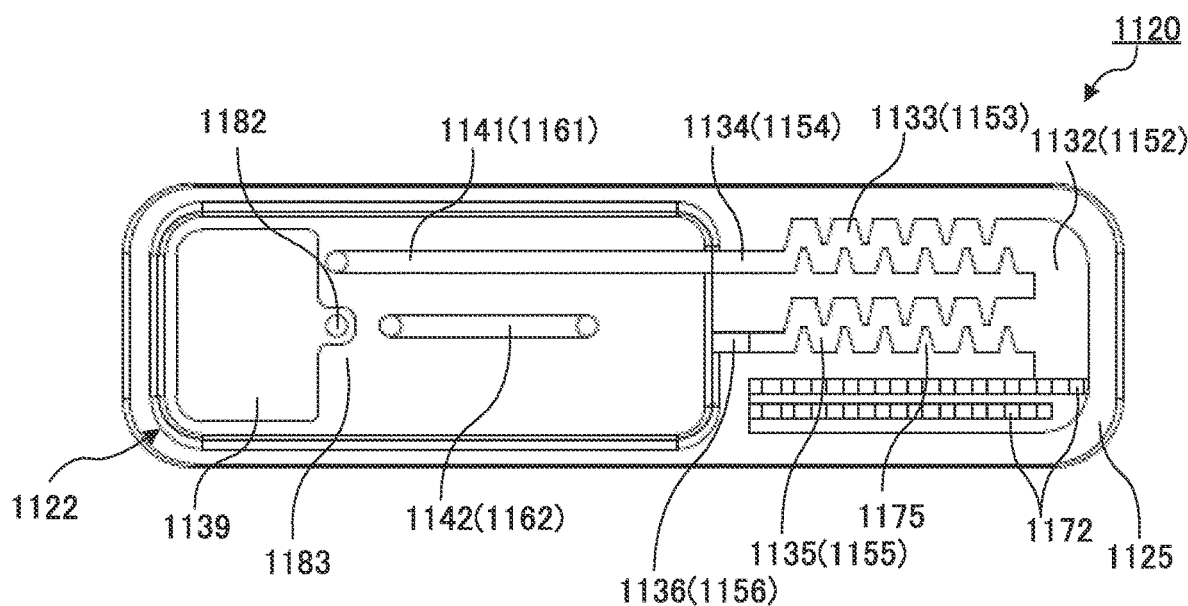
Figure 9C:
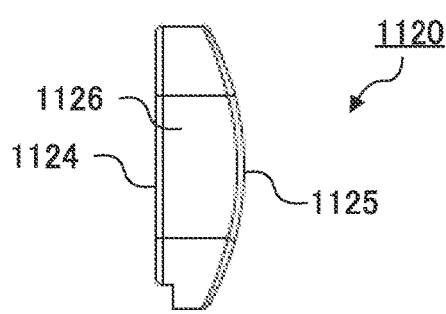
Figure 9D:
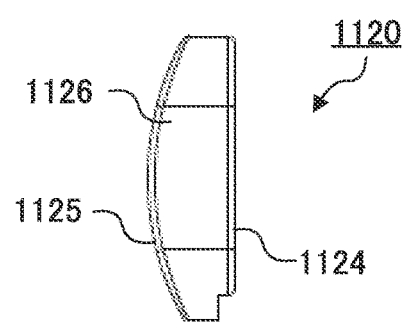
Figure 10A:
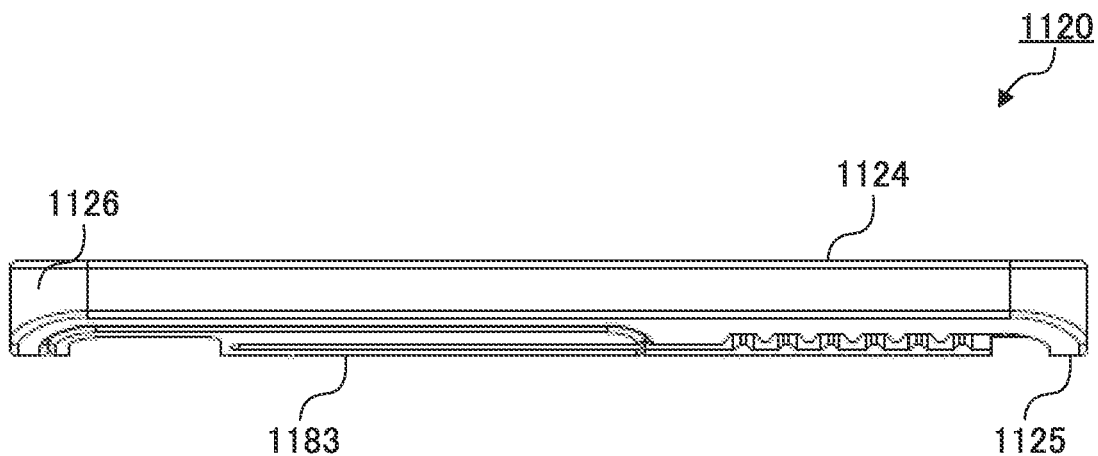
FIGS. 10A and 10B illustrate a configuration of the emitter according to Embodiment 2 after the base seat part is housed in the housing part.
Figure 10B:
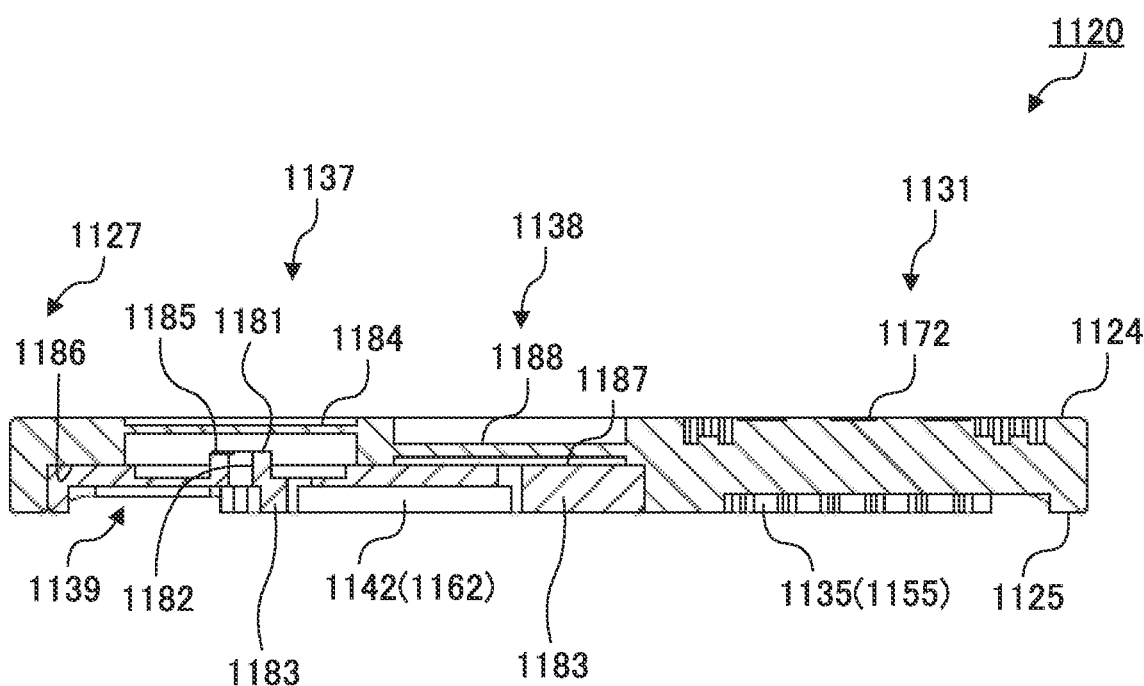
Figure 11A:
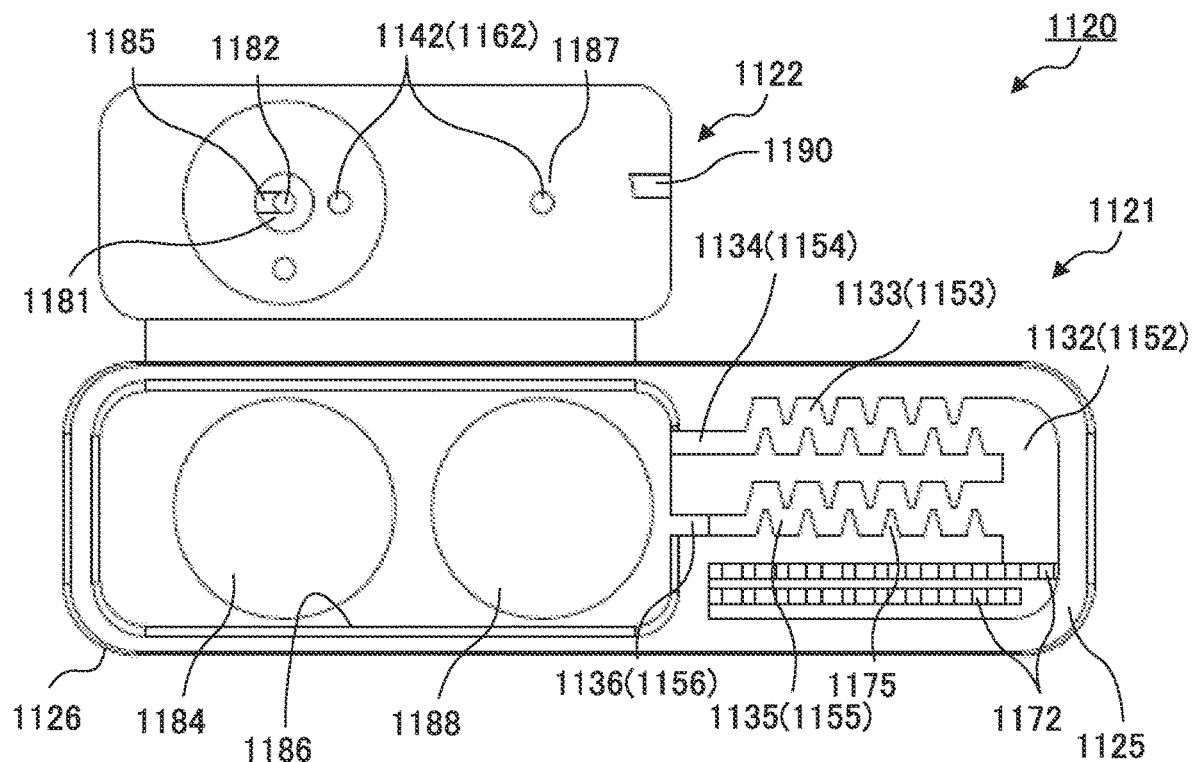
FIGS. 11A to 11E illustrate a configuration of the emitter according to Embodiment 2 before the base seat part is housed in the housing part.
Figure 11B:
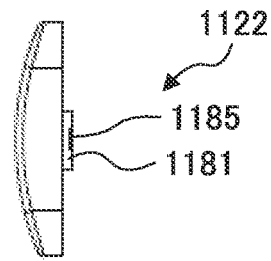
Figure 11C:
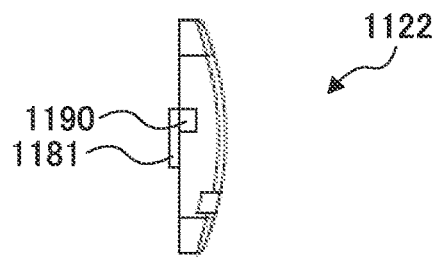
Figure 11D:
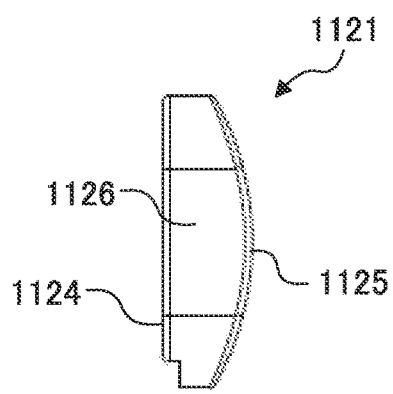
Figure 11E:
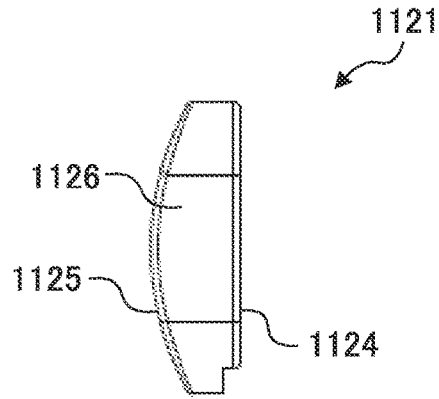
Figure 12A:
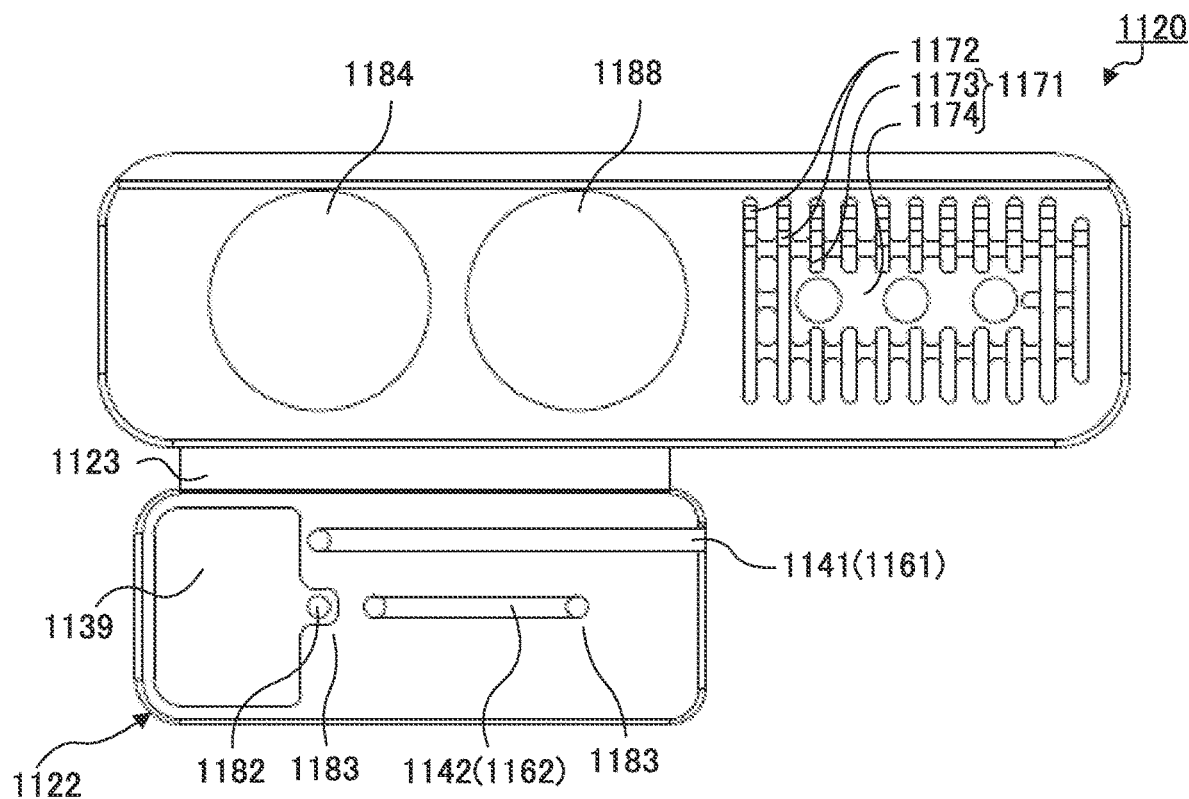
FIGS. 12A and 12B illustrate a configuration of the emitter according to Embodiment 2 before the base seat part is housed in the housing part.
Figure 12B:
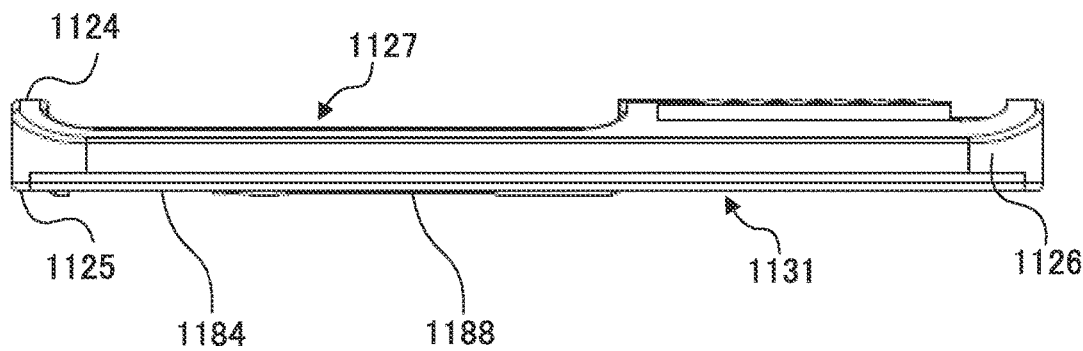

FIGS. 9A to 10B illustrate a configuration of emitter 1120 according to Embodiment 2 after base seat part 1122 is housed in housing part 1127. FIG. 9A is a plan view of emitter 1120, FIG. 9B is a bottom view, FIG. 9C is a left side view, and FIG. 9D is a right side view. FIG. 10A is a front view, and FIG. 10B is a sectional view taken along line A-A of FIG. 9A. FIGS. 11A to 12B illustrate a configuration of emitter 1120 according to Embodiment 2 before base seat part 1122 is housed in housing part 1127. FIG. 11A is a bottom view of emitter 1120, FIG. 11B is a left side view of base seat part 1122, FIG. 11C is a right side view of base seat part 1122, FIG. 11D is a left side view of emitter body 1121, and FIG. 11E is a right side view of emitter body 1121. FIG. 12A is a plan view of emitter 1120, and FIG. 12B is a front view of emitter body 1121.

As illustrated in FIGS. 9A to 12B, emitter 1120 includes emitter body 1121, base seat part 1122 housed in emitter body 1121. Before emitter 1120 is joined to tube 110 (see FIG. 1), base seat part 1122 is housed in housing part 1127 of emitter body 1121 from rear surface 1125 side opposite to discharging port 111. Emitter body 1121 and base seat part 1122 may be formed integrally with each other, or may be formed as separate members. In the present embodiment, emitter body 1121 and base seat part 1122 are formed in a state where they are connected to each other through hinge part 1123. Then, the boundary between emitter body 1121 and hinge part 1123 is disconnected and base seat part 1122 is housed in housing part 1127. The method of forming emitter body 1121, base seat part 1122 and hinge part 1123 integrally with each other is not limited. In the present embodiment, emitter body 1121, base seat part 1122, and hinge part 1123 are formed integrally with each other by injection molding.

Emitter body 1121 includes intake part 1131, first connecting groove 1132 serving as first connecting channel 1152, first pressure reducing groove 1133 serving as first pressure reducing channel 1153, second connecting groove 1134 serving as second connecting channel 1154, second pressure reducing groove 1135 serving as second pressure reducing channel 1155, third connecting groove 1136 serving as third connecting channel 1156, flow rate adjusting part 1137, and channel opening-closing part 1138. When base seat part 1122 is housed in housing part 1127 of emitter body 1121, flow rate adjusting part 1137, channel opening-closing part 1138 and discharging part 1139 are formed. Intake part 1131 is open at front surface 1124 of emitter body 1121. On the other hand, first connecting groove 1132, first pressure reducing groove 1133, second connecting groove 1134, second pressure reducing groove 1135, third connecting groove 1136 and housing part 1127 are open at rear surface 1125 of emitter body 1121. At rear surface 1125 of base seat part 1122, fourth connecting groove 1141 serving as fourth connecting channel 1161 and bypass groove 1142 serving as bypass channel 1162 are open.

When emitter 1120 is joined to tube 110, first connecting groove 1132, first pressure reducing groove 1133, second connecting groove 1134, third connecting groove 1136, second pressure reducing groove 1135, fourth connecting groove 1141 and bypass groove 1142 serve as first connecting channel 1152, first pressure reducing channel 1153, second connecting channel 1154, second pressure reducing channel 1155, third connecting channel 1156, fourth connecting channel 1161 and bypass channel 1162, respectively. With this configuration, a first channel composed of intake part 1131, first connecting channel 1152, first pressure reducing channel 1153, second connecting channel 1154, fourth connecting channel 1161, flow rate adjusting part 1137 and discharging part 1139, and configured to connect intake part 1131 and discharging part 1139 is formed. In addition, a second channel composed of intake part 1131, first connecting channel 1152, second pressure reducing channel 1155, third connecting channel 1156, channel opening-closing part 1138, bypass channel 1162, flow rate adjusting part 1137 and discharging part 1139, and configured to connect intake part 1131 and discharging part 1139 is formed. The first channel and the second channel carry the irrigation liquid from intake part 1131 to discharging part 1139.

Intake part 1131 is disposed in the half region of front surface 1124 of emitter body 1121. The number of intake parts 1131 is not limited. In the present embodiment, one intake part 1131 is disposed in one half surface in the longitudinal axial direction of emitter 1120 (FIG. 9A). Flow rate adjusting part 1137 and channel opening-closing part 1138 are disposed in the region where intake part 1131 is not disposed in front surface 1124 (FIG. 9A). Intake part 1131 includes intake side screen part 1171 and intake through hole 1172.

Intake side screen part 1171 prevents entry into intake through hole 1172 of floating matters in the irrigation liquid taken into emitter 1120. Intake side screen part 1171 opens to the interior of tube 110, and includes intake recess 1173 and ridge 1174.

Intake recess 1173 is a recess formed almost entirely in the half surface region in front surface 1124 of emitter 1120 where first diaphragm part 1184 and second diaphragm part 1188 are not disposed. The depth of intake recess 1173 is not limited, and is appropriately set in accordance with the size of emitter 1120. Ridge 1174 is formed on the bottom surface of intake recess 1173. In addition, intake through hole 1172 is formed in the bottom surface of intake recess 1173.

Ridge 1174 is disposed on the bottom surface of intake recess 1173. The arrangement and the number of ridge 1174 are not limited as long as irrigation liquid can be taken from the opening side of intake recess 1173 while preventing entry of floating matters in the irrigation liquid. In the present embodiment, a plurality of ridges 1174 is arranged in the longitudinal axial direction of intake recess 1173. In addition, ridge 1174 may be formed such that the width decreases from the front surface 1124 of emitter 1120 toward the bottom surface of intake recess 1173, or that the width does not change from the front surface 1124 of emitter 1120 to the bottom surface of intake recess 1173.

Intake through hole 1172 is formed in the bottom surface of intake recess 1173. The shape and the number of intake through holes 1172 are not limited as long as the irrigation liquid taken into intake recess 1173 can be taken into emitter body 1121. In the present embodiment, intake through hole 1172 is two long holes formed along the longitudinal axial direction of the bottom surface of intake recess 1173. Since the long holes are covered with the plurality of ridges 1174, each of the intake through holes 1172 appear to be divided into many through holes as viewed from the front side.

The irrigation liquid flowing inside tube 110 is taken into emitter 1120 while intake side screen part 1171 prevents entry of floating matters into intake through hole 1172.

First connecting groove 1132 (first connecting channel 1152) connects intake through hole 1172 (intake part 1131)

and first pressure reducing groove 1133 and second pressure reducing groove 1135. First connecting groove 1132 is formed along the outer edge of rear surface 1125 of emitter 1120. First pressure reducing groove 1133 is connected to one end portion of first connecting groove 1132, and second pressure reducing groove 1135 is connected to a center portion of first connecting groove 1132. When tube 110 and emitter 1120 are joined to each other, first connecting groove 1132 and inner wall surface 112 of tube 110 form first connecting channel 1152. Irrigation liquid taken from intake part 1131 flows through first connecting channel 1152 to first pressure reducing channel 1153 and second pressure reducing channel 1155.

First pressure reducing groove 1133 (first pressure reducing channel 1153) connects first connecting groove 1132 (first connecting channel 1152) and second connecting channel 1154. First pressure reducing groove 1133 (first pressure reducing channel 1153) depressurizes the irrigation liquid taken from intake part 1131 and guides the irrigation liquid toward flow rate adjusting part 1137. First pressure reducing groove 1133 is disposed along the longitudinal axial direction in one end portion of rear surface 1125 in the minor axis direction. The upstream end of first pressure reducing groove 1133 is connected to first connecting groove 1132, and the downstream end is connected to second connecting groove 1134 communicated with flow rate adjusting part 1137. The shape of first pressure reducing groove 1133 is not limited as long as the above-described function can be ensured. In the present embodiment, first pressure reducing groove 1133 has a zigzag shape in plan view. In first pressure reducing groove 1133, protrusions 1175, each of which has a substantially triangular prism shape protruding from the inner surface, alternate along the flow direction of the irrigation liquid. Each protrusion 1175 is disposed such that its tip end does not cross the central axis of first pressure reducing groove 1133 in plan view. When tube 110 and emitter 1120 are joined to each other, first pressure reducing groove 1133 and inner wall surface 112 of tube 110 form first pressure reducing channel 1153. The irrigation liquid taken from intake part 1131 is depressurized by first pressure reducing channel 1153 and guided to flow rate adjusting part 1137.

Second connecting groove 1134 (second connecting channel 1154) connects first pressure reducing groove 1133 (first pressure reducing channel 1153) and fourth connecting groove 1141 (fourth connecting channel 1161). Second connecting groove 1134 is a groove linearly formed along the longitudinal axial direction of emitter 1120 on rear surface 1125 side of emitter 1120. The upstream end of second connecting groove 1134 is connected to first pressure reducing groove 1133, and the downstream end of second connecting groove 1134 is connected to fourth connecting groove 1141 (fourth connecting channel 1161). When tube 110 and emitter 1120 are joined to each other, second connecting groove 1134 and inner wall surface 112 of tube 110 form second connecting channel 1154. The irrigation liquid depressurized by first pressure reducing channel 1153 is guided to flow rate adjusting part 1137 through second connecting channel 1154.

Second pressure reducing groove 1135 (second pressure reducing channel 1155) connects first connecting groove 1133 (first connecting channel 1153) and third connecting groove 1136 (third connecting channel 1156). Second pressure reducing groove 1135 (second pressure reducing channel 1155) depressurizes the irrigation liquid taken from intake part 1131 and guides the irrigation liquid toward channel opening-closing part 1138. Second pressure reducing groove 1135 is disposed along the longitudinal axial direction in a center portion of rear surface 1125 in the minor axis direction. The upstream end of second pressure reducing groove 1135 is connected to first connecting groove 1132, and the downstream end is connected to third connecting groove 1136 communicated with channel opening-closing part 1138. Second pressure reducing groove 1135 has the same shape as the above-described first pressure reducing groove 1133. When tube 110 and emitter 1120 are joined to each other, second pressure reducing groove 1135 and inner wall surface 112 of tube 110 form second pressure reducing channel 1155. The irrigation liquid taken from intake part 1131 is depressurized by second pressure reducing channel 1155 and guided to channel opening-closing part 1138.

Third connecting groove 1136 (third connecting channel 1156) connects second pressure reducing groove 1135 (second pressure reducing channel 1155) and channel opening-closing part 1138. Third connecting groove 1136 is a groove linearly formed along the longitudinal axial direction of base seat part 1122 on rear surface 1125 side of base seat part 1122. The upstream end of third connecting groove 1136 is connected to second pressure reducing groove 1135, and the downstream end of third connecting groove 1136 is connected to channel opening-closing part 1138 (housing part 1127). When tube 110 and emitter 1120 are joined to each other, third connecting groove 1136 and inner wall surface 112 of tube 110 form third connecting channel 1156. The irrigation liquid coming from second pressure reducing channel 1155 flows to channel opening-closing part 1138 through third connecting channel 1156.

Fourth connecting groove 1141 (fourth connecting channel 1161) connects second connecting groove 1134 (second connecting channel 1154) and flow rate adjusting part 1137. Fourth connecting groove 1141 is a groove linearly formed along the longitudinal axial direction of base seat part 1122 on rear surface 1125 side of base seat part 1122. The upstream end of fourth connecting groove 1141 is connected to second connecting channel 1154, and the downstream end of fourth connecting groove 1141 is connected to flow rate adjusting part 1137 (housing part 1127). When tube 110 and emitter 1120 are joined to each other, fourth connecting groove 1141 and inner wall surface 112 of tube 110 form fourth connecting channel 1161. The irrigation liquid coming from second connecting channel 1154 flows to flow rate adjusting part 1137 through fourth connecting channel 1161.

Flow rate adjusting part 1137 adjusts the flow rate of incoming irrigation liquid. Flow rate adjusting part 1137 is disposed in the region where intake part 1131 is not disposed in emitter 1120. Flow rate adjusting part 1137 includes housing part 1127, first base seat 1181, communication hole 1182, deformation suppression part 1183, and first diaphragm part 1184. In addition, base seat part 1122 includes first base seat 1181, communication hole 1182, connecting groove 1185, deformation suppression part 1183, and fourth connecting groove 1141.

Housing part 1127 includes recess 1186. In recess 1186, first base seat 1181 configured to adjust the discharging amount of the irrigation liquid coming from second connecting channel 1154 and discharged from discharging port 111 of tube 110, and second base seat 1187 configured to open and close the second channel are disposed. After first base seat 1181 and second base seat 1187 are disposed in recess 1186, emitter 1120 is joined to inner wall surface 112 of tube 110.

First base seat 1181 is a region with which first diaphragm part 1184 deformed under the pressure of the irrigation liquid makes contact. The shape of first base seat 1181 is not limited. The shape of first base seat 1181 may be a curved surface or a flat surface. In the present embodiment, the shape of first base seat 1181 is a flat surface.

Communication hole 1182 is used for discharging, toward discharging port 111, the irrigation liquid having entered housing part 1127. In the present embodiment, communication hole 1182 is open at a center portion of first base seat 1181. The size of the opening of communication hole 1182 is also not limited and may be appropriately set.

Connecting groove 1185 is a groove for guiding the irrigation liquid to communication hole 1182 even in the state where first diaphragm part 1184 is in contact with first base seat 1181. One end portion of connecting groove 1185 is communicated with communication hole 1182. The other end portion of connecting groove 1185 is disposed outside the outer edge of the contact region of first base seat 1181 in the state where first diaphragm part 1184 is in contact with first base seat 1181.

When first diaphragm part 1184 is in contact with first base seat 1181 under the pressure of the irrigation liquid, deformation suppression part 1183 makes contact with tube 110 to suppress the deformation of first base seat 1181. Deformation suppression part 1183 is disposed to protrude from the surface on the side opposite to the surface of first base seat 1181 with which first diaphragm part 1184 deformed under the pressure of the irrigation liquid makes contact. Deformation suppression part 1183 is disposed at the periphery of the opening of communication hole 1182 on discharging port 111 side. The shape of deformation suppression part 1183 is not limited as long as the deformation of first base seat 1181 can be suppressed. In the present embodiment, the shape of deformation suppression part 1183 is defined by the region around communication hole 1182 and the region on the rear side of second base seat 1187. The height of deformation suppression part 1183 is not limited as long as the deformation of first base seat 1181 can be suppressed. The height of deformation suppression part 1183 may be set such that it makes contact with the inner wall surface of tube 110 when disposed to tube 110, or that it does not make contact with the inner wall surface of tube 110 when disposed to tube 110.

When emitter 1120 is joined to inner wall surface 112 of tube 110, base seat part 1122 disposed in housing part 1127 and first diaphragm part 1184 facing first base seat 1181 form flow rate adjusting part 1137 configured to adjust the flow rate of the irrigation liquid discharged from communication hole 1182 of emitter 1120 (first base seat 1181) in accordance with the pressure of the irrigation liquid in tube 110. In the present embodiment, first diaphragm part 1184 has a circular shape in plan view. In the present embodiment, first diaphragm part 1184 is formed integrally with other configurations of emitter body 1121.

First diaphragm part 1184 is formed integrally with other configurations of emitter body 1121, and thus has flexibility. In the state where emitter 1120 is joined to inner wall surface 112 of tube 110, first diaphragm part 1184 is deformed toward first base seat 1181 by the pressure of the irrigation liquid in tube 110.

Channel opening-closing part 1138 closes the second channel in accordance with the pressure in tube 110, and stops the feeding of the irrigation liquid to flow rate adjusting part 1137 through the second channel. Channel opening-closing part 1138 is disposed in the region where intake part 1131 and flow rate adjusting part 1137 of emitter 1120 are not disposed. Channel opening-closing part 1138 includes housing part 1127, second base seat 1187, deformation suppression part 1183, and second diaphragm part 1188.

Second base seat 1187 is a region with which second diaphragm part 1188 deformed under the pressure of the irrigation liquid makes contact. The shape of second base seat 1187 is not limited. The shape of second base seat 1187 may be a curved surface or a flat surface. In the present embodiment, the shape of second base seat 1187 is a flat surface. Cutout groove 1190 is formed in a part of the flat surface where second base seat 1187 is disposed.

Cutout groove 1190 is used for appropriately guiding, to recess 1186, the irrigation liquid from third connecting channel 1156. The shape of cutout groove 1190 is not limited as long as the above-mentioned function can be ensured. In the present embodiment, cutout groove 1190 is formed in a linear shape.

When emitter 1120 is joined to inner wall surface 112 of tube 110, base seat part 1122 disposed in housing part 1127 and second diaphragm part 1188 facing second base seat 1187 form channel opening-closing part 1138 configured to open and close the second channel in accordance with the pressure of the irrigation liquid in tube 110. In the present embodiment, second diaphragm part 1188 has a circular shape in plan view. In the present embodiment, second diaphragm part 1188 is formed integrally with other configurations of emitter body 1121. In addition, flow rate adjusting part 1137 and channel opening-closing part 1138 are connected through bypass channel 1162.

Second diaphragm part 1188 is formed integrally with other configurations of emitter body 1121, and thus has flexibility. In the state where emitter 1120 is joined to inner wall surface 112 of tube 110, second diaphragm part 1188 is deformed toward second base seat 1187 by the pressure of the irrigation liquid in tube 110.

In the present embodiment, emitter body 1121 and base seat part 1122 are manufactured in the state where they are connected to each other with hinge part 1123 therebetween as described above. During manufacture of emitter 1120, hinge part 1123 connects emitter body 1121 and base seat part 1122. The shape and the size of hinge part 1123 may be appropriately set as long as the above-described function can be ensured. In the present embodiment, hinge part 1123 is connected to surface 1126 contiguous with rear surface 1125. Hinge part 1123 may be disposed at a side surface at either end in the longitudinal axial direction (the flow direction of the irrigation liquid) of emitter body 1121, or at side surface 1126 at either end in the minor axis direction both of emitter body 1121. Preferably, to prevent blockage of the flow of the irrigation liquid, hinge part 1123 is connected to side surface 1126 on the upstream side or the downstream side in the flow direction of the irrigation liquid.

Discharging part 1139 temporarily stores the irrigation liquid from communication hole 1182. The irrigation liquid reaching discharging part 1139 is discharged to the outside from discharging port 111.

Now an operation of first diaphragm part 1184 and second diaphragm part 1188 in accordance with the pressure of the irrigation liquid in tube 110 is described.

Before irrigation liquid is fed into tube 110, the pressure of the irrigation liquid is not applied to first diaphragm part 1184 and second diaphragm part 1188, and therefore first diaphragm part 1184 and second diaphragm part 1188 are not deformed.

When the feeding of irrigation liquid into tube 110 is started, first diaphragm part 1184 of flow rate adjusting part 1137 deforms toward first base seat 1181. In addition, second diaphragm part 1188 of channel opening-closing part 1138 deforms toward second base seat 1187. However, in this state, first diaphragm part 1184 is not in contact with first base seat 1181, and second diaphragm part 1188 is not in contact with second base seat 1184, and therefore, the irrigation liquid taken from intake part 1131 is discharged to the outside from discharging port 111 of tube 110 through both the first channel and the second channel. In this manner, at the start of the feeding of irrigation liquid into tube 110, and in the case where the pressure of the irrigation liquid in tube 110 is significantly low and the like, the irrigation liquid taken from the intake part is discharged through both the first channel and the second channel.

When the pressure of the irrigation liquid in tube 110 reaches a predetermined first pressure, second diaphragm part 1188 makes contact with second base seat 1187 to close the second channel. At this time, first diaphragm part 1184 is not in contact with first base seat 1181. In this manner, when the pressure of the irrigation liquid in tube 110 increases to a value enough to deform second diaphragm part 1188, second diaphragm part 1188 comes closer to second base seat 1187, and accordingly the amount of the irrigation liquid discharged through the second channel decreases. Then, when the pressure of the irrigation liquid in tube 110 reaches a predetermined first pressure, the irrigation liquid in the second channel is not discharged from discharging port 111. As a result, the irrigation liquid taken from intake part 1131 is discharged to the outside from discharging port 111 of tube 110 through only the first channel.

When the pressure of the irrigation liquid in tube 110 further increases, first diaphragm part 1184 further deforms toward first base seat 1181. When the pressure of the irrigation liquid is relatively low, the deformation of first diaphragm part 1184 is relatively small, and first diaphragm part 1184 does not make contact with first base seat 1181. In this state, communication hole 1182 of first base seat 1181 is not closed, and therefore the irrigation liquid entering the space between first diaphragm part 1184 and first base seat 1181 from fourth connecting channel 1161 is discharged to discharging part 1139 from communication hole 1182.

When the pressure of the irrigation liquid exceeds a set value, the deformation amount of first diaphragm part 1184 further increases, and first diaphragm part 1184 makes intimate contact with first base seat 1181. It should be noted that connecting groove 1185 is not closed even when first diaphragm part 1184 is in intimate contact with first base seat 1181. Therefore, the irrigation liquid entering the space from fourth connecting channel 1161 is discharged from communication hole 1182 to discharging part 1139 through connecting groove 1185. Thus, even when first diaphragm part 1184 is in intimate contact with first base seat 1181, irrigation liquid of a certain amount or more is discharged to discharging part 1139.

Note that also in the present embodiment, emitter 1120 includes deformation suppression part 1183 to suppress the above-mentioned deformation of first base seat 1181, and the deformation of first base seat 1181 is suppressed by deformation suppression part 1183 even when the deformation amount of first diaphragm part 1184 is increased. More specifically, the pressure of first diaphragm part 1184 against first base seat 1181 is canceled by the reactive force that is generated when the bottom surface of deformation suppression part 1183 makes contact with the inner wall surface of tube 110. In addition, emitter 1120 includes deformation suppression part 1183 to suppress the above-mentioned deformation of second base seat 1187, and the deformation of second base seat 1187 is suppressed by deformation suppression part 1183 even when the deformation amount of second diaphragm part 1188 is increased. More specifically, the pressure of second diaphragm part 1188 against second base seat 1187 is canceled by the reactive force that is generated when the bottom surface of deformation suppression part 1183 makes contact with the inner wall surface of tube 110.

With this configuration, regardless of the pressure of the irrigation liquid in tube 110, irrigation liquid of a certain amount or greater can be reliably discharged from communication hole 1182. That is, drip irrigation tube 100 according to the present embodiment can discharge irrigation liquid of a certain amount or greater to the outside of tube 110 regardless of whether the pressure of the irrigation liquid is high or low.

Effect

As described above, emitter 1120 according to the present embodiment has an effect similar to that of emitter 120 according to Embodiment 1.

Embodiment 3

A drip irrigation tube according to Embodiment 3 differs from drip irrigation tube 100 according to Embodiment 1 only in configuration of emitter 1220. In view of this, emitter 1220 of the drip irrigation tube according to Embodiment 3 is described below.

Configuration of Emitter

Figure 13A:
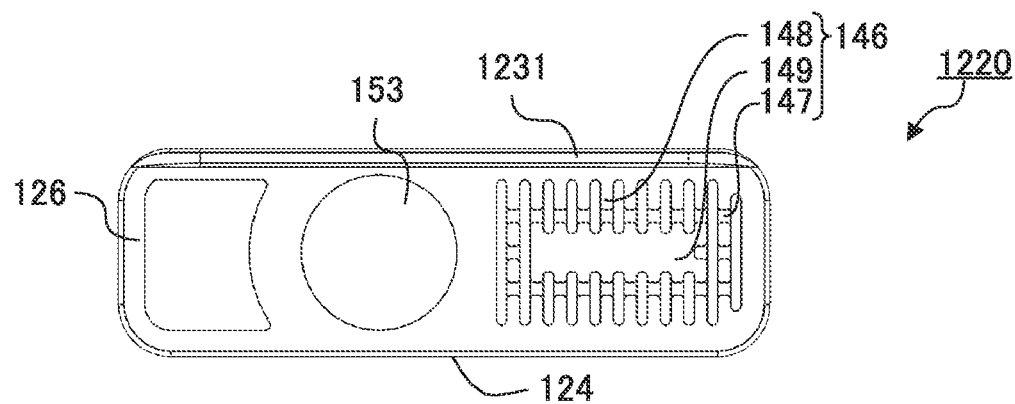
FIGS. 13A to 13C illustrate a configuration of an emitter according to Embodiment 3 after a base seat part is housed in a housing part.
Figure 13B:
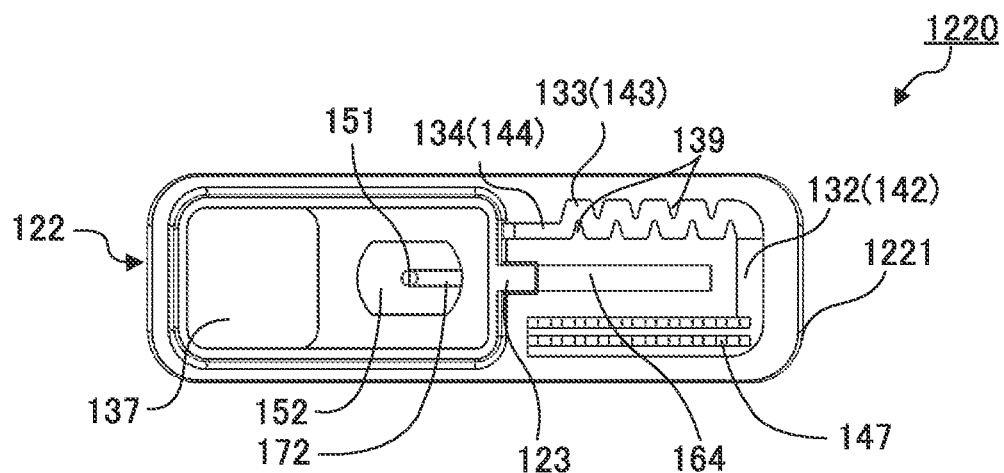
Figure 13C:
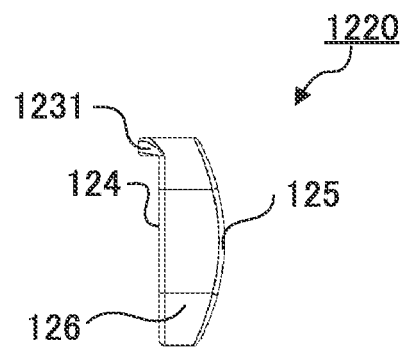

FIGS. 13A to 13C illustrate a configuration of emitter 1220 according to Embodiment 3 after base seat part 122 is housed in housing part 135. FIGS. 14A to 14F illustrate configurations of emitter 1220 according to Modifications 1 to 3 of Embodiment 3 after base seat part 122 is housed in housing part 135. FIG. 13A is a plan view of emitter 1220 according to Embodiment 3, FIG. 13B is a bottom view, and FIG. 13C is a right side view. FIG. 14A is a plan view of emitter 1220 according to Modification 1 of Embodiment 3, FIG. 14B is a right side view of emitter 1220 according to Modification 1, FIG. 14C is a plan view of emitter 1220 according to Modification 2, FIG. 14D is a right side view of emitter 1220 according to Modification 2, FIG. 14E is a plan view of emitter 1220 according to Modification 3, and FIG. 14F is a right side view of emitter 1220 according to Modification 3.

As illustrated in FIGS. 13A to 13C, emitter 1220 according to Embodiment 3 includes emitter body 1221 and base seat part 122 housed in emitter body 1221. Emitter body 1221 includes first protrusion part 1231 in addition to intake part 131, first connecting groove 132, pressure reducing groove 133, second connecting groove 134 and flow rate adjusting part 136.

First protrusion part 1231 functions to reduce the contact area between emitter 1220 and a parts-feeder during production of the drip irrigation tube. The drip irrigation tube is produced by continuously joining emitter 1220 formed in advance to the inner surface of the tube while continuously forming the tube, for example. At this time, emitters 1220 formed in advance are stored in the parts-feeder, and continuously sent into the tube from the parts-feeder. However, static electricity may be generated due to friction between the emitter and the inner surface of the parts-feeder and the emitter may be stuck to the inner surface of the parts-feeder, thus reducing the production efficiency. In view of this, first protrusion part 1231 is disposed at front surface 124 in emitter 1220 according to the present embodiment.

The shape and the installation of first protrusion part 1231 are not limited as long as the contact area with the inner surface of the parts-feeder can be reduced as described above. In the present embodiment, first protrusion part 1231 is disposed over the entirety of one end portion in the minor axis direction along the longitudinal axis of emitter 1220. In other words, in plan view of emitter 1220, first protrusion part 1231 is disposed over the entirety of one long side. The height of first protrusion part 1231 is not limited as long as the contact area between front surface 124 and the inner surface of the parts-feeder can be reduced, and may be appropriately set.

The shape of first protrusion part 1231 is not limited to the example illustrated in FIGS. 13A to 13C. For example, as illustrated in FIGS. 14A and 14B, first protrusion part 1331 may be disposed in a part of a center portion of one long side of emitter 1320 (emitter body 1321). In addition, as illustrated in FIGS. 14C and 14D, first protrusion part 1431 may be disposed at both end portions in one long side. In addition, as illustrated in FIGS. 14E and 14F, first protrusion part 1531 may be disposed in both long sides of emitter 1520 (emitter body 1521).

Effect

As described above, emitters 1220, 1320, 1420 and 150 according to the present embodiment can reduce the contact area with the parts-feeder while achieving the effect of the emitter according to Embodiment 1, and thus can improve the productivity.

Embodiment 4

A drip irrigation tube according to Embodiment 4 differs from drip irrigation tube 100 according to Embodiment 1 only in configuration of emitter 1620. In view of this, emitter 1620 of the drip irrigation tube according to Embodiment 4 is described below.

Configuration of Emitter

Figure 15A:
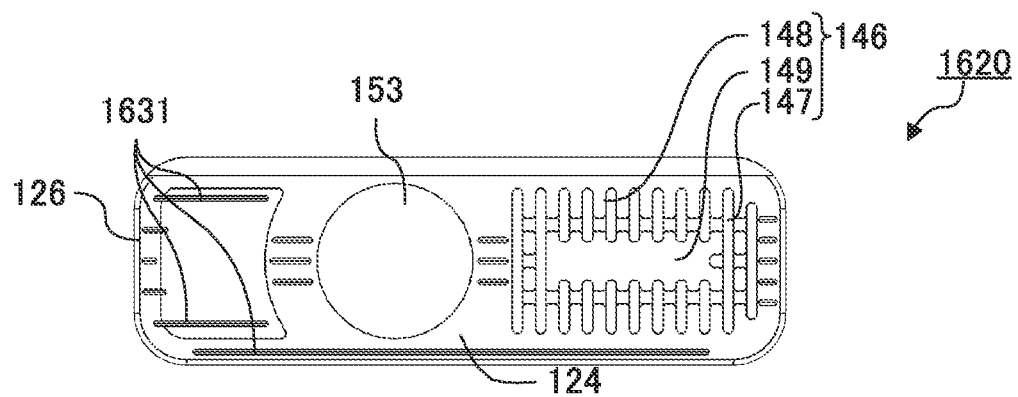
FIGS. 15A to 15D illustrate a configuration of an emitter according to Embodiment 4 after a base seat part is housed in a housing part.
Figure 15B:
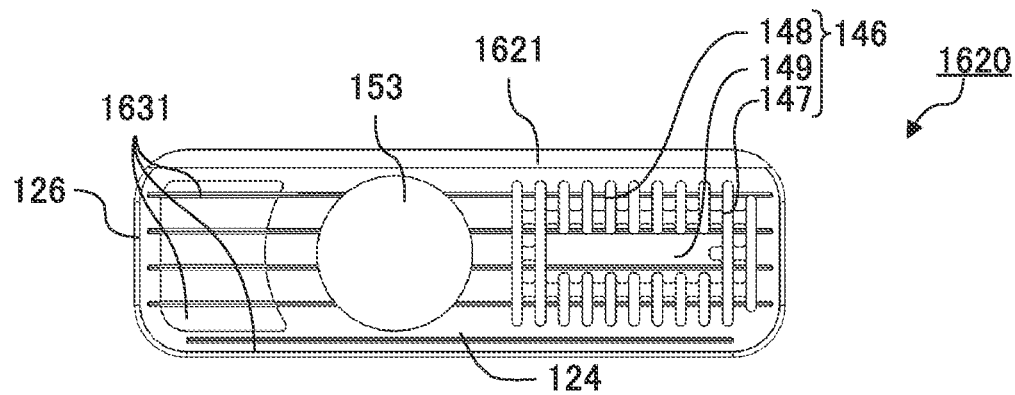
Figure 15C:
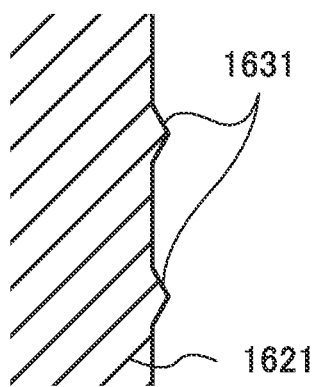
Figure 15D:
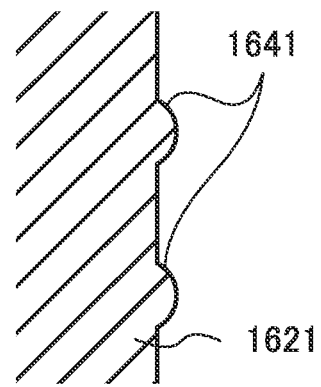
Figure 17A:
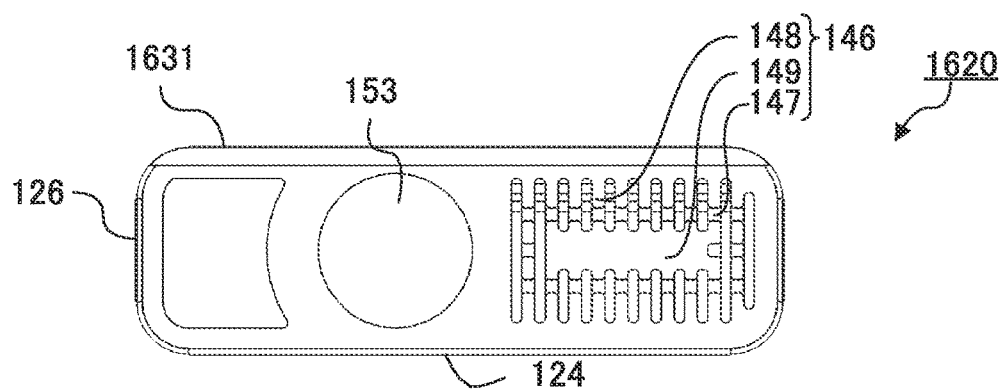
FIGS. 17A to 17E illustrate a configuration of an emitter according to Modification 2 of Embodiment 4.
Figure 17B:
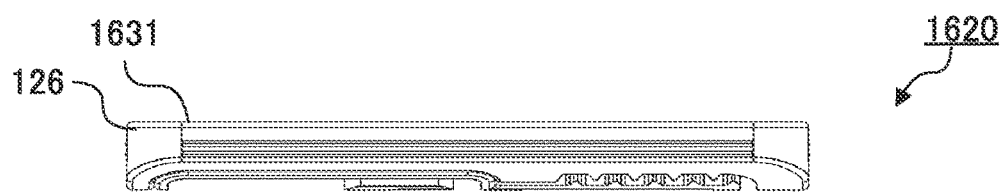
Figure 17C:
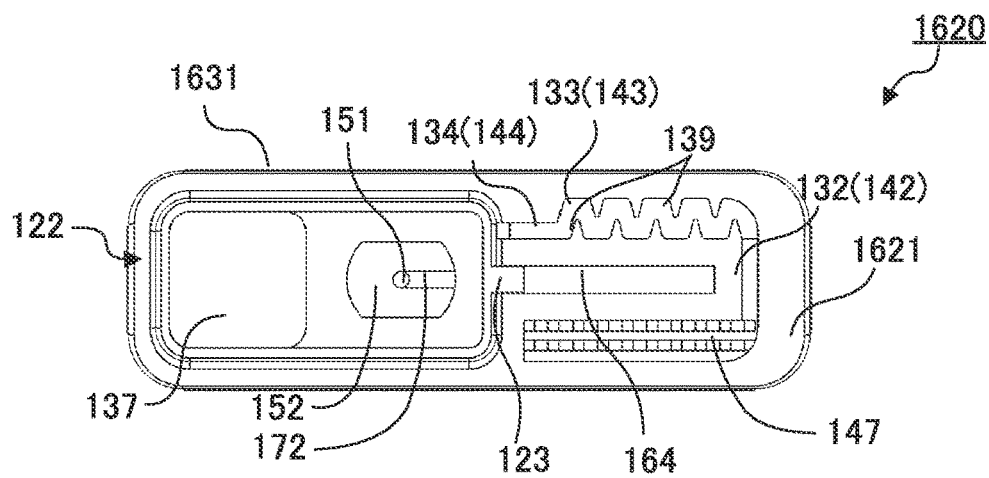
Figure 17D:
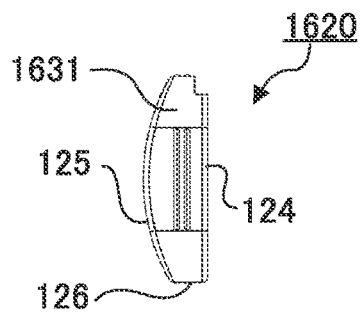
Figure 17E:
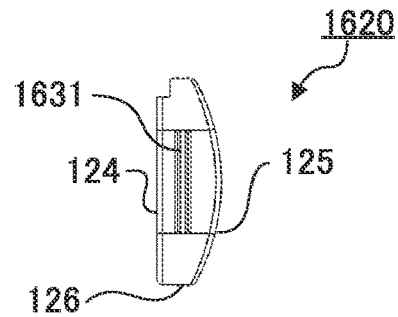
Figure 18A:
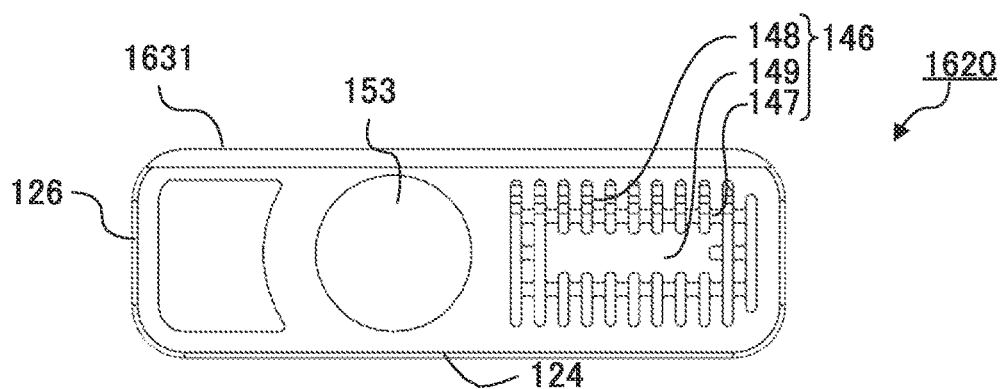
FIGS. 18A to 18E illustrate a configuration of an emitter according to Modification 3 of Embodiment 4.
Figure 18B:
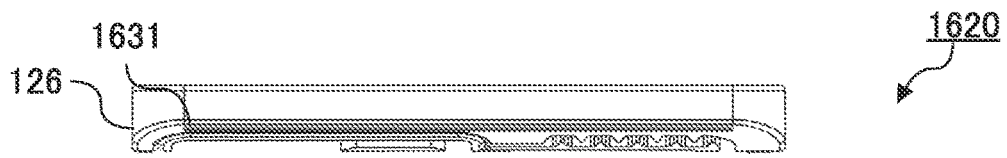
Figure 18C:
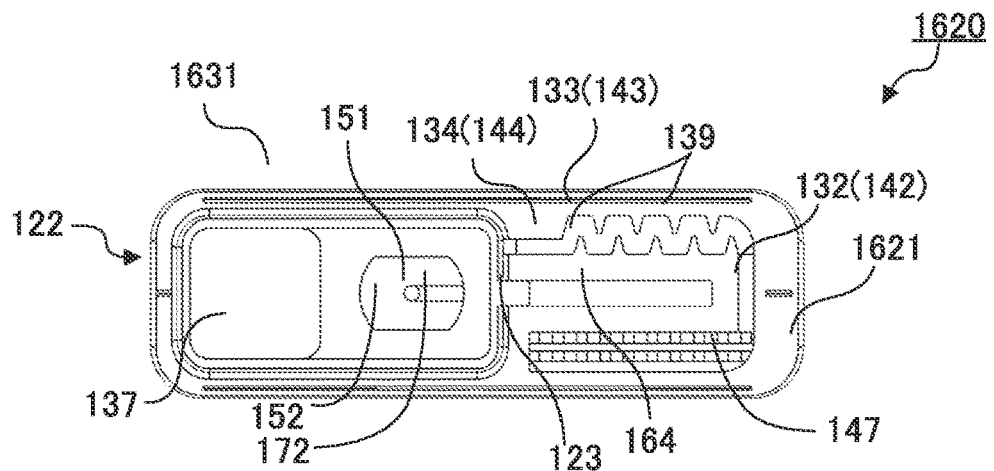
Figure 18D:
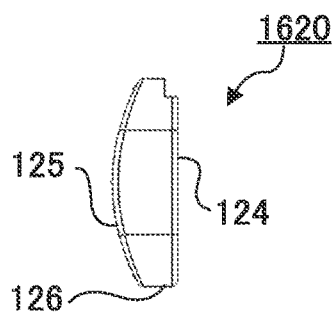
Figure 18E:
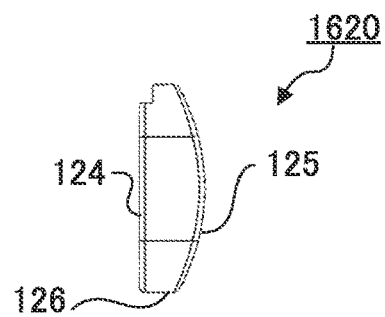

FIGS. 15A to 15D illustrate a configuration of emitter 1620 according to Embodiment 4. FIGS. 16A to 18E illustrate configuration of emitters 1620 according to Modifications 1 to 3 of Embodiment 4. FIG. 15A is a plan view of emitter 1620 according to Embodiment 4, FIG. 15B illustrates another exemplary installation of second protrusion part 1631, FIG. 15C is a sectional view illustrating a shape of second protrusion part 1631, and FIG. 15D is a sectional view illustrating another shape of second protrusion part 1631. FIG. 16A is a plan view of emitter 1620 according to Modification 1 of Embodiment 4, FIG. 16B is a front view, FIG. 16C is a bottom view, FIG. 16D is a left side view, and FIG. 16E is a right side view. FIG. 17A is a plan view of emitter 1620 according to Modification 2 of Embodiment 4, FIG. 17B is a front view, FIG. 17C is a bottom view, FIG. 17D is a left side view, and FIG. 17E is a right side view. FIG. 18A is a plan view of emitter 1620 according to Modification 3 of Embodiment 4, FIG. 18B is a front view, FIG. 18C is a bottom view, FIG. 18D is a left side view, and FIG. 18E is a right side view.

As illustrated in FIGS. 15A to 15D, emitter 1620 according to Embodiment 4 includes emitter body 1621 and base seat part 122 housed in emitter body 1621. Emitter body 1621 includes a plurality of second protrusion parts 1631 in addition to intake part 131, first connecting groove 132, pressure reducing groove 133, second connecting groove 134 and flow rate adjusting part 136.

The plurality of second protrusion parts 1631 reduces the contact area with the guide rail during production of the drip irrigation tube. As described above, the drip irrigation tube is produced by continuously joining emitter 1620 formed in advance to the inner surface of the tube while continuously forming the tube, for example. At this time, emitter 1620 is conveyed to the tube with a rail called guide rail. The cross-sectional shape of the guide rail orthogonal to the sending direction of emitter 1620 is substantially complementary with the cross-sectional shape of emitter 1620, and is partially communicated with the outside. In this case, when emitter 1620 makes contact with the inner surface of the guide rail, emitter 1620 may be clogged, or emitter 1620 may not perform the feeding at a constant speed. In view of this, in emitter 1620 according to the present embodiment, second protrusion part 1631 is disposed at front surface 124.

The shape and the installation of the plurality of second protrusion parts 1631 are not limited as long as the contact area of the inner surface of the guide rail can be reduced as described above. In the present embodiment, the plurality of second protrusion parts 1631 is disposed at an interval over the entire surface along the longitudinal axis of emitter 1620. The height of second protrusion part 1631 is not limited as long as the contact area between front surface 124 and the inner surface of the guide rail can be reduced, and may be appropriately set. The cross-sectional shape of second protrusion part 1631 orthogonal to the extending direction is not limited. For example, the cross-sectional shape may be a triangular shape (see FIG. 15C) or a semicircular shape (see FIG. 15D).

The position of the plurality of second protrusion parts 1631 is not limited to the example illustrated in FIGS. 15A and 15B. For example, as illustrated in FIGS. 16A to 16E, second protrusion part 1631 may be disposed over the whole circumference of the side surface of emitter 1620. In addition, as illustrated in FIGS. 17A to 17E, second protrusion part 1631 may be disposed only in a part of the side surface of emitter 1620. In addition, as illustrated in FIGS. 18A to 18E, second protrusion part 1631 may be disposed in rear surface 125 of emitter 1620.

Effect

As described above, emitter 1620 according to the present embodiment can reduce the contact area with the guide rail while achieving the effect of the emitter according to Embodiment 1, and thus can improve the productivity.

Embodiment 5

A drip irrigation tube according to Embodiment 5 differs from drip irrigation tube 100 according to Embodiment 1 only in configuration of emitter 1720. In view of this, emitter 1720 of the drip irrigation tube according to Embodiment 5 is described below.

Configuration of Emitter

Figure 19A:
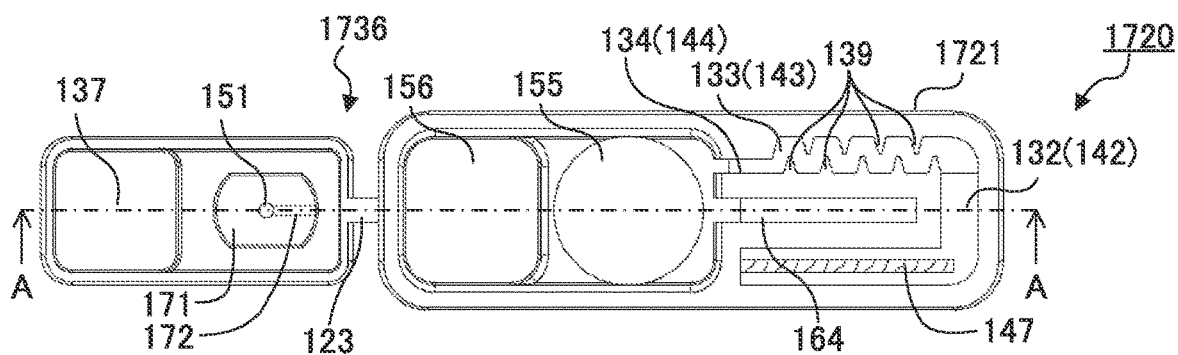
FIGS. 19A to 19D illustrate a configuration of an emitter according to Embodiment 5 before a base seat part is housed in a housing part.
Figure 19B:
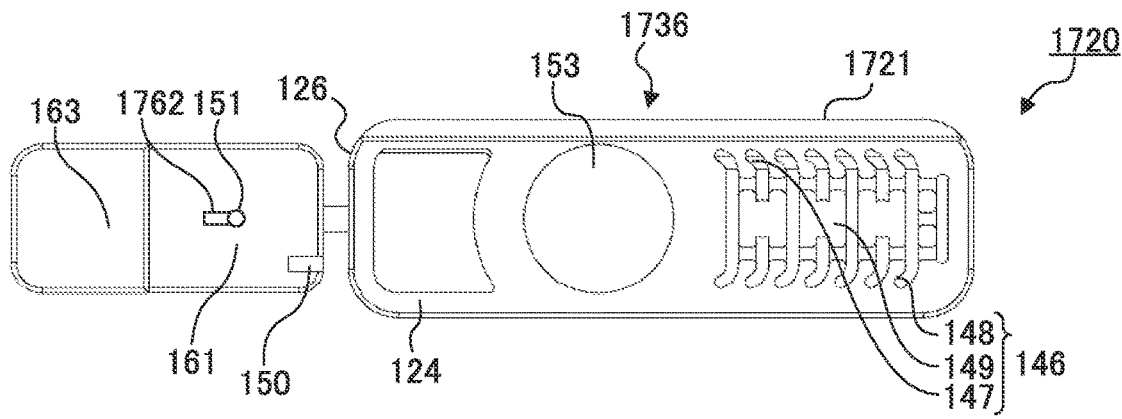
Figure 19C:
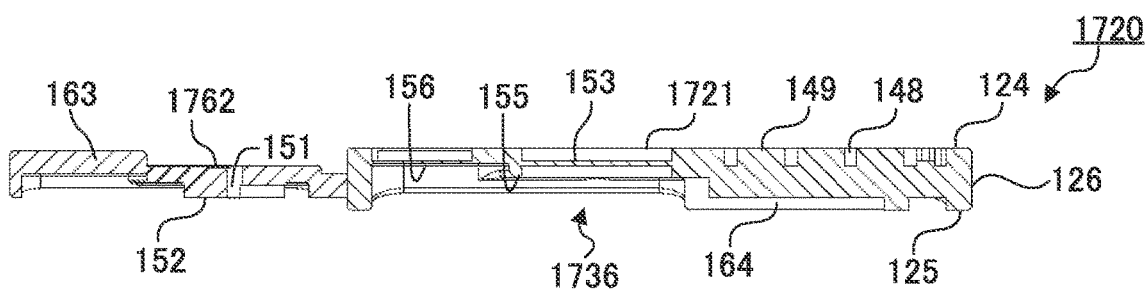
Figure 19D:
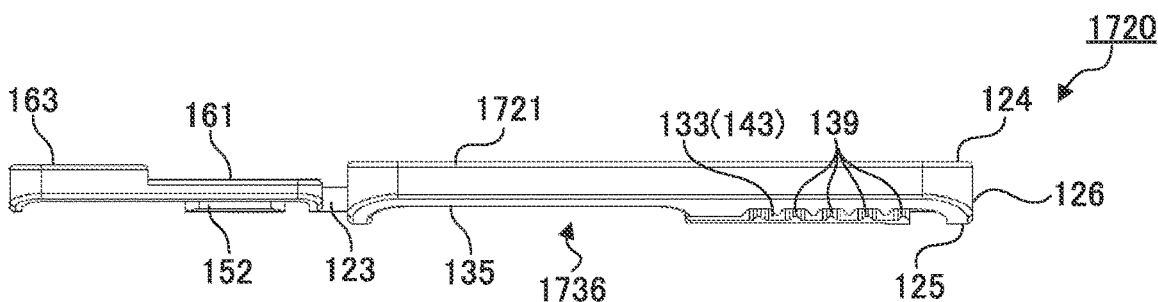

FIGS. 19A to 19D illustrate a configuration of emitter 1720 before base seat part 122 is housed in housing part 135. FIG. 19A is a bottom view of emitter 1720, FIG. 19B is a plan view, FIG. 19C is a sectional view taken along line A-A of FIG. 19A, and FIG. 19D is a front view.

As illustrated in FIGS. 19A to 19D, the emitter 1720 according to Embodiment 5 includes emitter body 1721 and base seat part 122 housed in emitter body 1721. Emitter 1720 includes intake part 131, first connecting groove 132, pressure reducing groove 133, second connecting groove 134, and flow rate adjusting part 1736.

Flow rate adjusting part 1736 includes housing part 135, base seat 161, communication hole 151, deformation suppression part 152, and diaphragm part 153. In addition, base seat part 122 includes base seat 161, communication hole 151, communication groove 1762, deformation suppression part 152, and protrusion 163.

Communication groove 1762 in the present embodiment is shorter than connecting groove 162 of emitter 120 according to Embodiment 1. With this configuration, in communication groove 1762, the opening on diaphragm part 153 side is completely closed when diaphragm part 153 makes contact with base seat 161 under the pressure of the irrigation liquid.

In the drip irrigation tube including emitter 1720, when the feeding of irrigation liquid into tube 110 is started, the pressure of the irrigation liquid in tube 110 increases, and diaphragm part 153 deforms. When the pressure of the irrigation liquid is relatively low, the deformation of diaphragm part 153 is relatively small, and diaphragm part 153 does not make contact with base seat 161. In this state, communication hole 151 of base seat 161 is not closed, and the irrigation liquid entering the space between diaphragm part 153 and base seat 161 from second connecting channel 144 is discharged to discharging part 137 from communication hole 151.

When the pressure of the irrigation liquid exceeds a set value, the deformation amount of diaphragm part 153 further increases, and a center portion of diaphragm part 153 makes intimate contact with base seat 161. It should be noted that when a center portion of diaphragm part 153 makes intimate contact with base seat 161, the opening of communication hole 151 on diaphragm part 153 side is closed, but the opening of communication groove 1762 on diaphragm part 153 side is not closed. Therefore, the irrigation liquid entering the space from second connecting channel 144 is discharged from communication hole 151 to discharging part 137 through communication groove 1672. Thus, a certain amount of irrigation liquid is discharged to discharging part 137 even when a center portion of diaphragm part 153 is in intimate contact with base seat 161.

When the pressure of the irrigation liquid further increases, the deformation amount of diaphragm part 153 further increases, and diaphragm part 153 makes intimate contact with base seat 161 so as to entirely cover the opening of communication groove 1762 on diaphragm part 153 side. In this state, the irrigation liquid entering the space from second connecting channel 144 is not discharged to discharging part 137. That is, the drip irrigation tube including emitter 1720 stops the discharging of the irrigation liquid from discharging port 111 of the tube when the pressure of the irrigation liquid in tube 110 becomes excessive.

Effect

As described above, emitter 1720 according to the present embodiment can stop the discharging of the irrigation liquid when the pressure of the irrigation liquid in tube 110 is excessive while achieving the effect of the emitter according to Embodiment 1.

Embodiment 6

A drip irrigation tube according to Embodiment 6 differs from drip irrigation tube 100 according to Embodiment 1 only in configuration of emitter 1820. In view of this, emitter 1820 of the drip irrigation tube according to Embodiment 6 is described below.

Figure 20A:
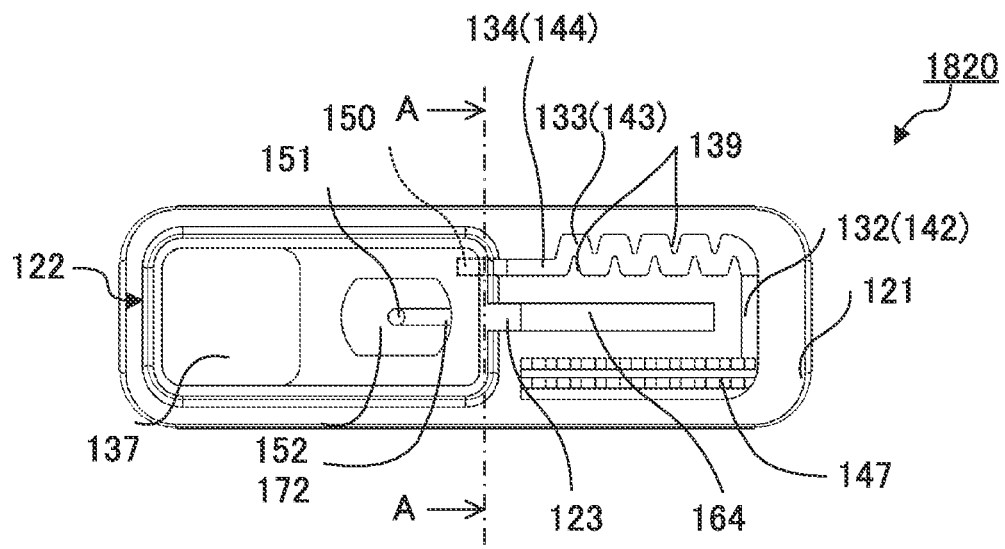
FIGS. 20A and 20B illustrate a configuration of an emitter according to Embodiment 6 after a base seat part is housed in a housing part.
Figure 20B:
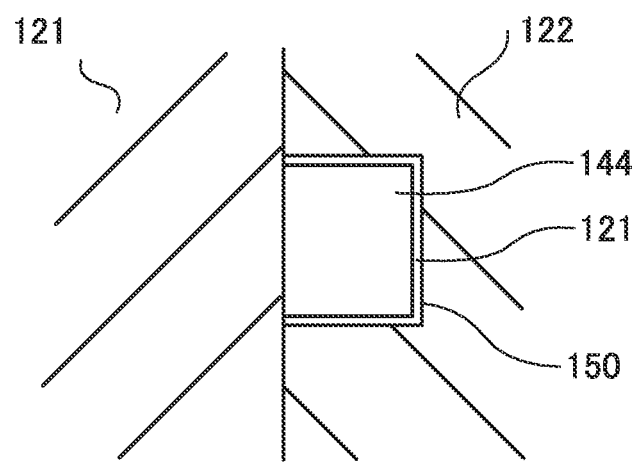

FIGS. 20A and 20B illustrate a configuration of emitter 1820 according to Embodiment 6. FIG. 20A is a plan view of emitter 1820 according to Embodiment 6, and FIG. 20B is a partially enlarged sectional view taken along line A-A of FIG. 20A, illustrating a connecting part of cutout groove 150 of base seat part 122 and second connecting channel 144 of emitter body 121.

As illustrated in FIGS. 20A and 20B, emitter 1820 according to the present embodiment includes emitter body 121 and base seat part 122.

Emitter body 121 includes intake part 131, first connecting groove 132 serving as first connecting channel 142, pressure reducing groove 133 serving as pressure reducing channel 143, second connecting groove 134 serving as second connecting channel 144, and housing part 135. Base seat part 122 includes cutout groove 150 (see FIG. 4B), base seat 161, communication hole 151, connecting groove 162, deformation suppression part 152, and protrusion 163. When base seat part 122 is housed in housing part 135 of emitter body 121, flow rate adjusting part 136 and discharging part 137 are formed. In addition, a connecting channel is disposed from emitter body 121 to base seat part 122 so as to connect pressure reducing groove 133 and flow rate adjusting part 136 (the space between diaphragm part 153 and base seat 161). This connecting channel is composed of cutout groove 150 of base seat part 122 and second connecting channel 144 of emitter body 121.

When emitter 1820 is joined to tube 110, first connecting groove 132, pressure reducing groove 133 and second connecting groove 134 serve as first connecting channel 142, pressure reducing channel 143 and second connecting channel 144, respectively. With this configuration, a channel composed of intake part 131, first connecting channel 142, pressure reducing channel 143, the above-mentioned connecting channel (second connecting channel 144 and cutout groove 150), flow rate adjusting part 136 and discharging part 137, and configured to connect intake part 131 and discharging part 137 is formed. This channel carries irrigation liquid from intake part 131 to discharging part 137.

In the above-mentioned connecting channel that connects pressure reducing groove 133 and flow rate adjusting part 136 (the space between diaphragm part 153 and base seat 161), second connecting channel 144 is composed of emitter body 121, whereas cutout groove 150 is composed of base seat part 122. As described above, emitter 1820 is formed by housing base seat part 122 in housing part 135 of emitter body 121. As such, a small gap is defined between base seat part 122 and housing part 135. Consequently, the positions of the opening as the downstream end of second connecting channel 144 of emitter body 121 and the opening as the upstream end of cutout groove 150 of base seat part 122 may be shifted from each other, and the irrigation liquid flowing through connecting part thereof may be unintentionally depressurized. In view of this, in the present embodiment, at the boundary between emitter body 121 and base seat part 122, the opening as the upstream end of cutout groove 150 of base seat part 122 (the opening of the connecting channel at base seat part 122 on emitter body 121 side) is configured to be larger than the opening as the downstream end of second connecting channel 144 of emitter body 121 (the opening of the connecting channel of emitter body 121 on base seat part 122 side), and thus the cross-sectional area of the channel at the connecting part is prevented from being reduced even when the positions of the downstream end of second connecting channel 144 and the upstream end of cutout groove 150 are shifted from each other. Thus, even when the positions of the downstream end of second connecting channel 144 and the upstream end of cutout groove 150 are shifted from each other, unintentional depressurization of the irrigation liquid flowing through the connecting parts is reduced.

Effect

As described above, emitter 1820 according to the present embodiment can adjust the flow rate of the irrigation liquid with high accuracy while achieving the effect of the emitter according to Embodiment 1.

This application is entitled to and claims the benefit of Japanese Patent Application No. 2018-140276 filed on Jul. 26, 2018 and Japanese Patent Application No. 2018-222273 filed on Nov. 28, 2018, the disclosure each of which including the specification, drawings and abstract is incorporated herein by reference in its entirety.

INDUSTRIAL APPLICABILITY

According to the present invention, it is possible to provide an emitter that can adjust the flow rate of output liquid at a low manufacturing cost. Therefore, wider use of the emitter in technical fields that require long-term dripping, such as drip irrigation and endurance testing, and further development of the technical fields are expected.

REFERENCE SIGNS LIST

100 Drip irrigation tube
110 Tube
111 Discharging port
112 Inner wall surface
120, 220, 320, 420, 520, 620, 720, 820, 920, 1120, 1220, 1320, 1420, 1520, 1620, 1720, 1820 Emitter
121, 1121, 1221, 1321, 1421, 1521, 1621, 1721 Emitter body
122, 1122 Base seat part
123, 923, 1123 Hinge part
124, 1124 Surface
125, 1125 Rear surface
126, 1126 Side surface
131, 1131 Intake part
132, 1132 First connecting groove
133 Pressure reducing groove
134, 1134 Second connecting groove
135, 1127 Housing part
136, 1137, 1736 Flow rate adjusting part
137, 1139 Discharging part
139, 1175 Protrusion
142, 1152 First connecting channel
143 Pressure reducing channel
144, 1154 Second connecting channel
146, 1171 Intake side screen part
147, 1172 Intake through hole
148, 1173 Intake recess
149, 1174 Ridge
150, 1190 Cutout groove
151, 1182 Communication hole
152, 252, 352, 452, 552, 652, 752, 852, 1183 Deformation suppression part
153 Diaphragm part
155 First recess
156 Second recess
161 Base seat
162, 1185 Connecting groove
163 Protrusion
164 Groove
171, 271, 371, 471, 571, 671, 771, 871 Deformation suppression part body
172, 272, 372, 472, 572, 672, 772, 872 Ejection groove
1133 First pressure reducing groove
1135 Second pressure reducing groove
1136 Third connecting groove
1138 Channel opening-closing part
1141 Fourth connecting groove
1142 Bypass groove
1153 First pressure reducing channel
1155 Second pressure reducing channel
1156 Third connecting channel
1161 Fourth connecting channel
1162 Bypass channel
1181 First base seat
1184 First diaphragm part
1188 Second diaphragm part
1186 Recess
1187 Second base seat
1231, 1331, 1431, 1531 First protrusion part
1631 Second protrusion part
1762 Communication groove

The invention claimed is:
1. An emitter configured to be joined to an inner wall surface of a tube for carrying irrigation liquid at a position corresponding to a discharging port configured to communicate between inside of the tube and outside of the tube to quantitatively discharge the irrigation liquid inside the tube from the discharging port to the outside of the tube, the emitter comprising:
    an emitter body; and
    a base seat part configured to be housed in the emitter body,
    wherein the emitter body includes:
        an intake part configured to take in the irrigation liquid,
        a pressure reducing channel groove communicated with the intake part and configured to form a pressure reducing channel, the pressure reducing channel being configured to carry the irrigation liquid while depressurizing the irrigation liquid,
        a housing part communicated with the pressure reducing channel groove and configured to house the base seat part,
        a diaphragm part having flexibility and configured to deform toward the base seat part when receiving a pressure of the irrigation liquid in the tube in a state where the base seat part is housed in the housing part, and
        a discharging part configured to temporarily store the irrigation liquid to be discharged from the discharging port, and
    wherein the base seat part includes:
        a base seat with which the diaphragm part under the pressure of the irrigation liquid in the tube makes contact,
        a communication hole whose one opening is open at the base seat, and whose another opening is open at a surface on a side opposite to the base seat, the communication hole being configured to discharge, toward the discharging port, the irrigation liquid having entered the housing part from the pressure reducing channel groove, and a deformation suppression part disposed to protrude from a surface on a side opposite to the base seat with which the diaphragm part deformed under the pressure of the irrigation liquid makes contact, and disposed at a periphery of the openings of the communication hole, the deformation suppression part being configured to suppress deformation of the base seat due to the pressure of the irrigation liquid by making contact with the tube when the diaphragm part under the pressure of the irrigation liquid is in contact with the base seat, and wherein the deformation suppression part includes a deformation suppression part body and an ejection groove, wherein one end portion of the ejection groove is communicated with the communication hole, and the other end portion of the ejection groove reaches a side surface of the deformation suppression part body on a side opposite to the discharging part in the deformation suppression part body.

2. The emitter according to claim 1, wherein the base seat part further includes a communication groove disposed in the base seat and configured such that an opening on a diaphragm part side is completely closed when the diaphragm part under the pressure of the irrigation liquid makes contact with the base seat.

3. The emitter according to claim 1,
wherein the emitter includes a connecting channel disposed from the emitter body to the base seat part and configured to connect the pressure reducing channel groove and a space between the diaphragm part and the base seat; and wherein at a boundary between the emitter body and the base seat part, an opening of the connecting channel on an emitter body side in the base seat part is larger than an opening of the connecting channel on a base seat part side in the emitter body.

4. A drip irrigation tube comprising:
a tube including a discharging port configured to discharge irrigation liquid; and
the emitter according to claim 1 that is joined at a position corresponding to the discharging port in an inner wall surface of the tube.

5. The drip irrigation tube according to claim 4, wherein in a state where a pressure of the irrigation liquid is not applied on the diaphragm part, the deformation suppression part is in contact with the inner wall surface of the tube.

* * * * *